US011157796B2

United States Patent
Tanabe et al.

(10) Patent No.: US 11,157,796 B2
(45) Date of Patent: Oct. 26, 2021

(54) JOINT POSITION ESTIMATION DEVICE, JOINT POSITION ESTIMATION METHOD, AND JOINT POSITION ESTIMATION PROGRAM

(71) Applicant: FUJITSU LIMITED, Kawasaki (JP)

(72) Inventors: Satoshi Tanabe, Meguro (JP); Ryosuke Yamanaka, Kawasaki (JP); Mitsuru Tomono, Higashimurayama (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 16/576,848

(22) Filed: Sep. 20, 2019

(65) Prior Publication Data

US 2020/0012922 A1    Jan. 9, 2020

Related U.S. Application Data

(63) Continuation of application No. PCT/JP2017/011141, filed on Mar. 21, 2017.

(51) Int. Cl.
*G06N 3/04* (2006.01)
*G06N 3/08* (2006.01)
(Continued)

(52) U.S. Cl.
CPC ....... *G06N 3/0454* (2013.01); *G06K 9/00342* (2013.01); *G06K 9/38* (2013.01);
(Continued)

(58) Field of Classification Search
CPC ........ G06N 3/0454; G06N 20/00; G06N 3/02; G06N 5/048; G06N 3/00; G06N 3/08;
(Continued)

(56) References Cited

U.S. PATENT DOCUMENTS 10,679,046 B1* 6/2020 Black ................. G06T 17/00
2007/0269089 A1 11/2007 Sakaida
(Continued)

FOREIGN PATENT DOCUMENTS

JP 2000-251078 A 9/2000
JP 2007-307205 A 11/2007
(Continued)

OTHER PUBLICATIONS

Structured Feature Learning for Pose Estimation (Year: 2016).*
(Continued)

*Primary Examiner* — Nizar N Sivji
(74) *Attorney, Agent, or Firm* — Fujitsu Patent Center

(57) ABSTRACT

A joint position estimation device including a memory, and a processor connected to the memory. The processor executes a process including estimating, by a first DNN for which a first parameter determined by learning of the first DNN has been set, a body part region of the animal with respect to input image to be processed; and estimating, by the second DNN for which a second parameter determined by learning of the second DNN has been set, a first joint position and a second joint position in each of the body part region estimated by the first DNN and a plural body parts region in which a plurality of the body part regions are connected.

10 Claims, 19 Drawing Sheets

(51) Int. Cl.
*G06K 9/38* (2006.01)
*G06T 7/73* (2017.01)
*G06K 9/00* (2006.01)

(52) U.S. Cl.
CPC .............. *G06N 3/08* (2013.01); *G06T 7/75* (2017.01); *G06K 2209/05* (2013.01); *G06T 2207/20084* (2013.01)

(58) Field of Classification Search
CPC . G06T 2207/20084; G06T 2207/20081; G06T 7/0012; G06T 7/70; G06T 7/73; G06T 2207/30196; G06T 2207/30008; G06T 3/4046; G06T 9/002; G06T 7/215; G06T 2207/30012; G06T 7/75; G06K 9/38; G06K 9/00342; G06K 2209/05; G06K 9/00362; G06K 9/3233; G06K 9/627; G06K 9/4628

See application file for complete search history.

(56) References Cited

U.S. PATENT DOCUMENTS

| | | | |
|---|---|---|---|
| 2013/0230211 A1 | 9/2013 | Tanabiki et al. | |
| 2015/0036879 A1 | 2/2015 | Shiozaki et al. | |
| 2016/0174902 A1* | 6/2016 | Georgescu | G06T 7/0012 600/408 |
| 2017/0344860 A1* | 11/2017 | Sachs | G06T 7/73 |

FOREIGN PATENT DOCUMENTS

| | | |
|---|---|---|
| JP | 2015-167008 A | 9/2015 |
| JP | 2016-212688 A | 12/2016 |
| WO | 2012046392 A1 | 4/2012 |

OTHER PUBLICATIONS

A Survey of Deep Neural Network Architectures and Their Application (Year: 2016).*
Jifeng Dai et al.,"Instance-aware Semantic Segmentation via Multi-task Network Cascades", Computer Vision and Pattern Recognition(CVPR), Dec. 14, 2015 (10 pages).
Jonathan Tompson et al.,"Joint Training of a Convolutional Network and a Graphical Model for Human Pose Estimation", Advances in Neural Information Processing Systems 27 (NIPS 2014), 2014, pp. 1-9 (9 pages).
Xiaochuan Fan et al., "Combining Local Appearance and Holistic View: Dual-Source Deep Neural Networks for Human Pose Estimation", 2015 IEEE Conference on Computer Vision and Pattern Recognition(CVPR), IEEE, Apr. 27, 2015, pp. 1347-1355 (9 pages).
International Search Report and Written Opinion of the International Searching Authority (Form PCT/ISA/210), mailed in connection with PCT/JP2017/011141 and dated Jun. 20, 2017 (4 pages).

* cited by examiner

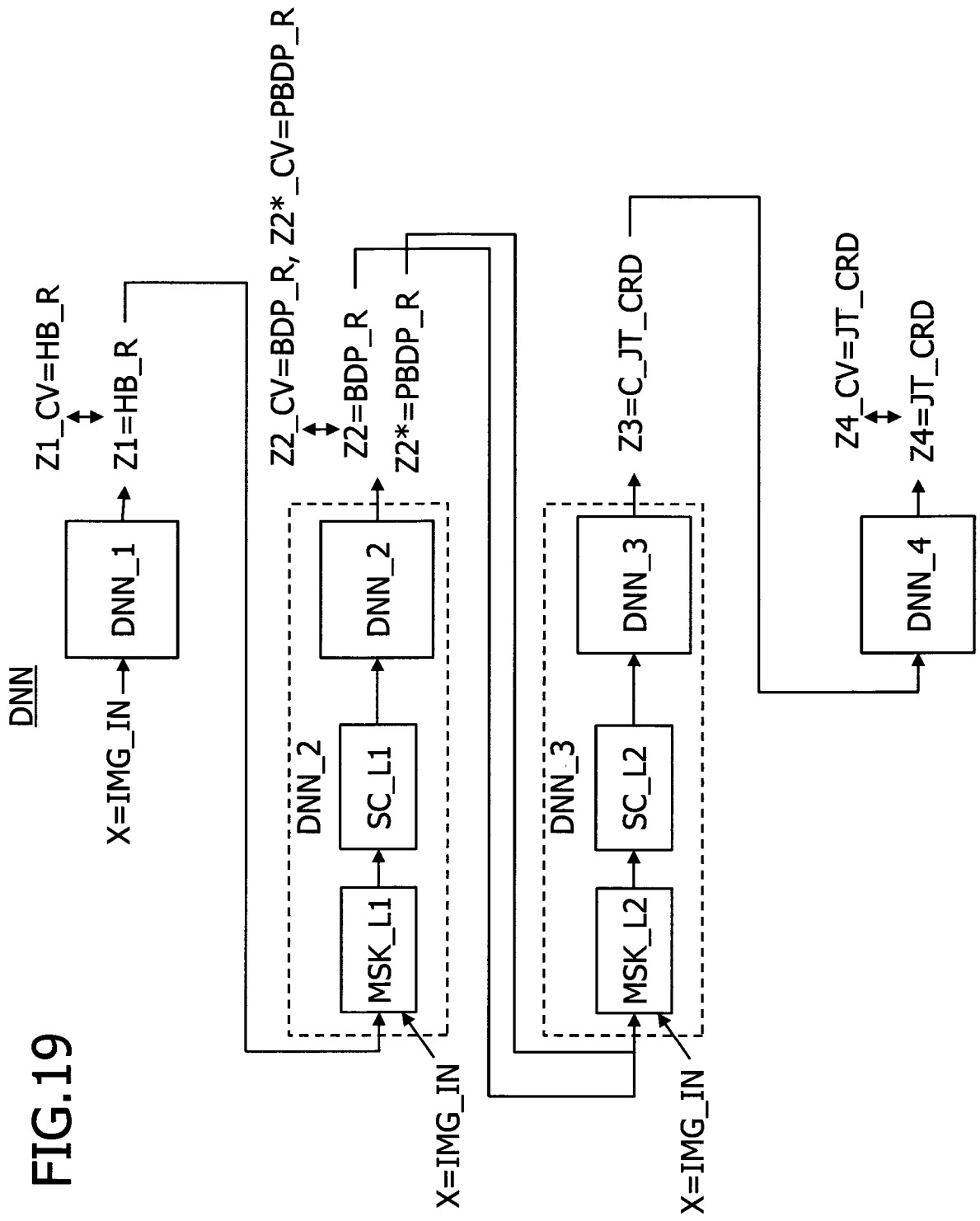

JOINT POSITION ESTIMATION DEVICE, JOINT POSITION ESTIMATION METHOD, AND JOINT POSITION ESTIMATION PROGRAM

CROSS-REFERENCE TO RELATED APPLICATION

This application is a continuation application of International Application PCT/JP2017/011141 filed on Mar. 21, 2017 and designated the U.S., the entire contents of which are incorporated herein by reference.

FIELD

The present invention relates to a joint position estimation device, a joint position estimation method, and a joint position estimation program.

BACKGROUND

A joint position estimation device estimates the position of joints from an image of a human or an animal. For example, automatic scoring by machines in artistic gymnastics is performed by estimating the positions of joints from an image of a gymnast and evaluating points from angle information on the joints.

A neural network for extracting a human or an animal as well as an object from an image and recognizing an extracted object is disclosed in the following Non Patent Literature. Methods for estimating joints of human bodies are disclosed in the following Patent Literatures 1 to 3.

Meanwhile, deep learning is a field of machine learning. In deep learning, a deep neural network (hereinafter referred to as "DNN") as a model of machine learning is provided with teaching data for learning. When provided with an input to be processed (such as images, voice, and text), a DNN as a model optimized by the learning executes arithmetic operation by the DNN to calculate or estimate an output.

PRIOR ART

Patent Literature

Patent Literature 1: Japanese Laid-open Patent Publication No. 2015-167008
Patent Literature 2: Japanese Laid-open Patent Publication No. 2007-307205
Patent Literature 3: International Publication Pamphlet No. WO 2012/046392

Non Patent Literature

Non Patent Literature 1: Instance-aware Semantic Segmentation via Multi-task Network Cascades, CVPR, 2016

SUMMARY

When a DNN model is used to estimate the positions of joints from an image of a human or an animal, various problems are encountered. For example, when a body part in an image is hidden by an obstacle, a joint in the hidden body part cannot be estimated. In artistic gymnastics, particularly the pommel horse, body parts of a human are frequently hidden. Such a problem of occlusion needs to be solved.

Another problem is that when an unexpected image other than a human or an animal is included in an input image, it is difficult to recognize a human or animal joint with high accuracy, and the accuracy of joint estimation is low.

According to an aspect of the embodiments, a joint position estimation device including a memory, and a processor connected to the memory, wherein the processor executes a process including: executing learning of a first deep neural network (hereinafter referred to as "DNN"), by using inputs of first teaching data as input images and correct data of the first teaching data as a body part region of an animal in the input image; executing learning of a second DNN by using inputs of second teaching data as an image of a body part region in the input image of the second teaching data and an image of a plural body parts region in which a plurality of the body part regions are connected, and correct data of the second teaching data as joint positions in the body part region and the plural body parts region; estimating, by the first DNN for which a first parameter determined by learning of the first DNN has been set, a body part region of the animal with respect to input image to be processed; and estimating, by the second DNN for which a second parameter determined by learning of the second DNN has been set, a first joint position and a second joint position in each of the body part region estimated by the first DNN and a plural body parts region in which a plurality of the body part regions are connected.

According to a first aspect, the accuracy of estimating the positions of joints of a human or an animal in an input image can be improved.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a diagram for describing learning of the entire DNN in Step S34.

DESCRIPTION OF EMBODIMENTS

A joint position estimation device according to this embodiment estimates, from image data in which an animal including humans and animals other than humans is included, the positions of joints of the animal. For simplicity, this embodiment is described below by way of example in which the positions of joints of a human as an example of animals are estimated. Note that the joint position estimation device in this embodiment can also estimate the positions of joints of animals other than humans.

[Outline of Function Position Estimation Device]

Figure 1:
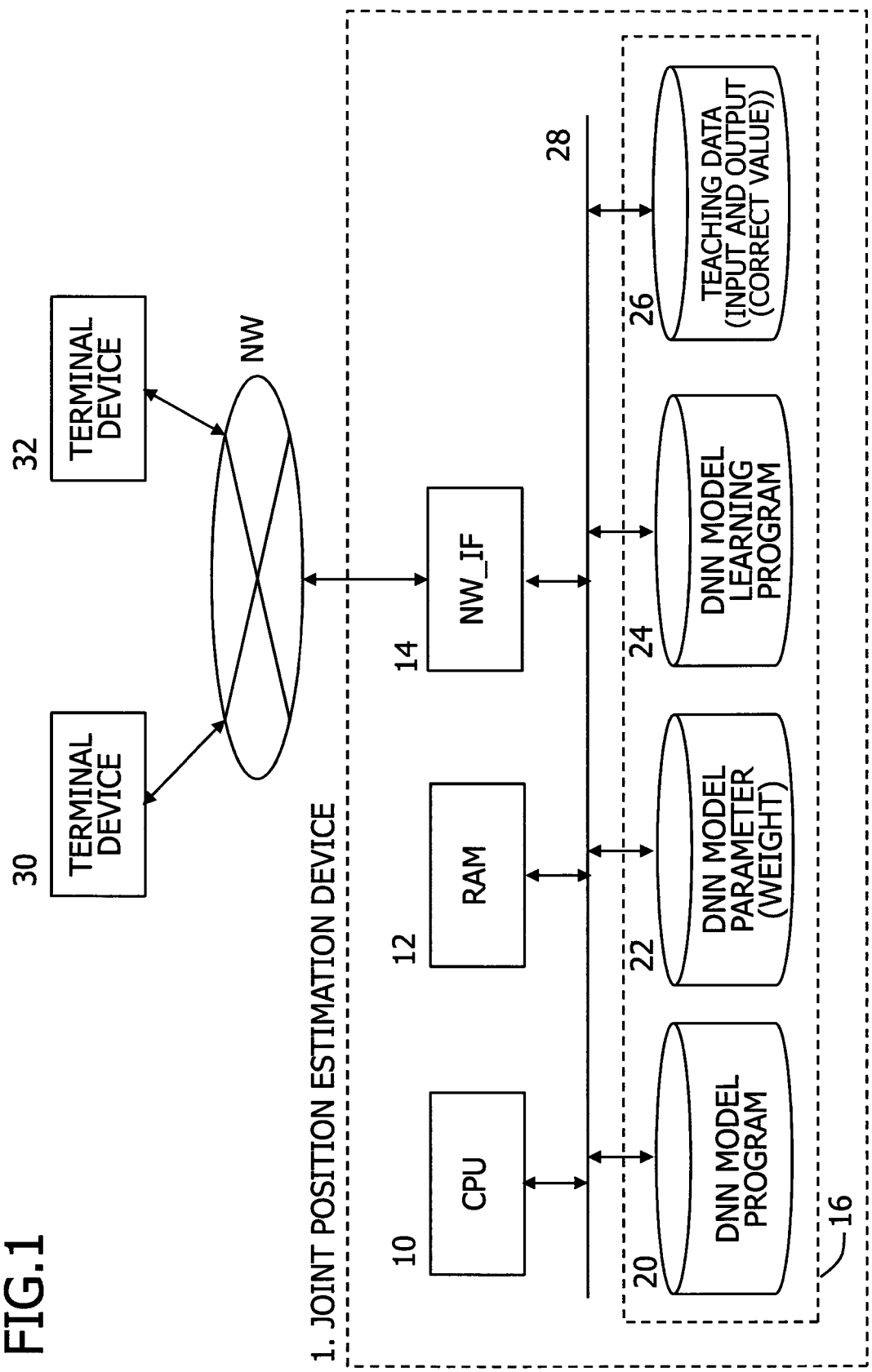
FIG. 1 is a diagram illustrating a configuration of a joint position estimation device in this embodiment.

FIG. 1 is a diagram illustrating a configuration of a joint position estimation device in this embodiment. A joint position estimation device 1 is an information processing device, such as a computer and a server. The joint position estimation device 1 includes a processor 10, a main memory 12, a network interface 14, and a large-capacity auxiliary storage device 16. In the auxiliary storage device 16, a DNN program 20, DNN parameters 22 set for DNN, a DNN learning program 24, and teaching data 26 used for learning of DNN are stored. The teaching data 26 has inputs to be input to DNN and correct values as correct outputs. The DNN program 20, the DNN parameters 22 set for DNN, the DNN learning program 24, and the teaching data 26 used for learning of DNN are stored in the main memory 12, and the processor executes each program.

The network interface 14 is connected to a network NW, and the joint position estimation device 1 is communicably connected to external terminal devices 30 and 32 through the network NW.

The joint position estimation device 1 employs a deep neural network (DNN) as a model of deep learning. The joint position estimation device 1 is provided with the teaching data 26 having data input to the DNN and its correct data. The processor 10 executes the DNN learning program 24, uses the teaching data to execute the learning of DNN, and determines an optimal parameter of the DNN. The processor sets the optimal parameter to the DNN program 20, and executes the DNN program 20 to estimate the positions of joints of an animal (including human or animal other than human) from an image to be processed.

The DNN program 20 is a program for executing various kinds of arithmetic processing for DNN as a model. The DNN learning program 24 is a program for executing various kinds of arithmetic processing for DNN associated with the learning of DNN as a model, and processing for extracting an optimal parameter. The DNN learning program executes various kinds of arithmetic processing for DNN by calling the DNN program 20. The DNN optimizes the parameter by learning using the teaching data, and hence the DNN learning program 24 is always attached or incorporated in the DNN program 20.

Figure 2:
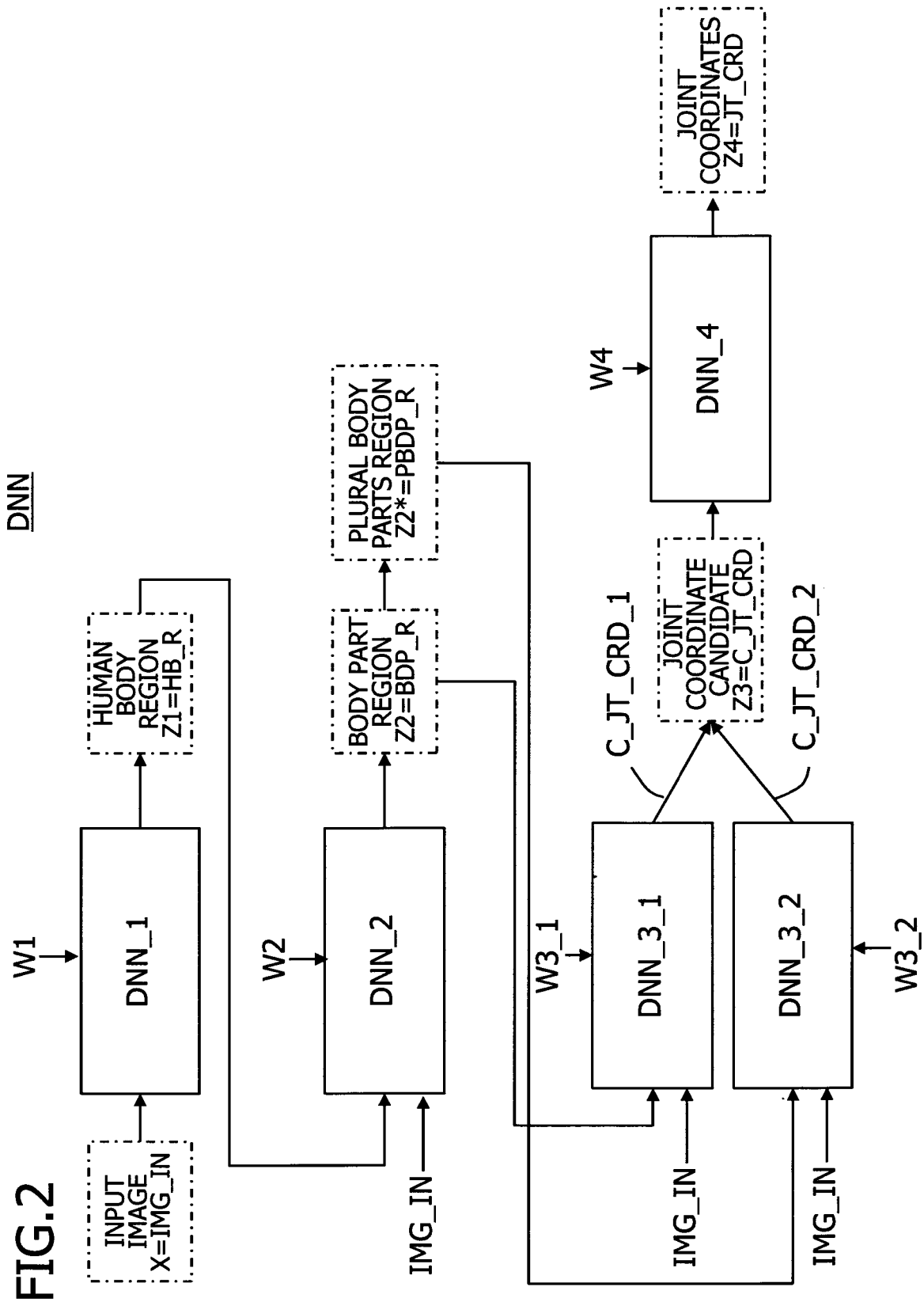
FIG. 2 is a diagram illustrating a configuration example of the DNN in this embodiment.

FIG. 2 is a diagram illustrating a configuration example of the DNN in this embodiment. The DNN has DNN_1, DNN_2, DNN_3-1, DNN3_2, and DNN_4, which are a plurality of DNNs arranged between input and output. In the figure, input data and output data are illustrated by chain line blocks for each of the plurality of DNNs. The DNN may be implemented by LSI, but in this embodiment, the DNN is implemented by the processor executing a DNN program for executing various kinds of DNN arithmetic operations.

DNN has the following four DNN_1 to DNN_4:

(1) the first DNN (DNN_1) which calculates or estimates, from input images IMG_IN, a human body region HB_R where a human body is present in the input image;

(2) the second DNN (DNN_2) which input an image of a human body region obtained by cropping the human body region HB_R from the input image IMG_IN or a feature image (not shown) generated by an intermediate layer of DNN_1, and calculates or estimates a body part region BDP_R, which is a region where a body part is present;

(3) the third DNN (DNN_3) which input an image of a body part region and an image of a plural body parts region obtained by cropping each of a single body part region BFP_R and a plural body parts region PBDP_R, which is obtained by connecting a plurality of single body part regions, from the input image IMG_IN or the feature image, and calculates or estimates joint position candidates (joint coordinate candidates) C_JT_CRD in the images; and (4) the fourth DNN (DNN_4) which input the joint coordinate candidates C_JT_CRD to calculate or estimate joint coordinates JT_CRD.

The third DNN (DNN_3) has DNN_3_1 for calculating or estimating a first joint coordinate candidate C_JT_CRD_1 from an image of a single body part region, and DNN_3_2 for calculating or estimating a second joint coordinate candidate C_JT_CRD_2 from an image of a plural body parts region. The first joint coordinate candidate C_JT_CRD_1 and the second joint coordinate candidate C_JT_CRD_2 are sometimes estimated with the same joint coordinates duplicated. The joint coordinates JT_CRD are obtained by removing the duplication of joint coordinates estimated from the first and second joint coordinate candidates while being duplicated.

DNN_2 has a masking layer (not shown) for cropping or cutting out the human body region HB_R from the input image IMG_IN or its feature image and a scaling layer (not shown) for matching the size of an image of the cropped human region with the input of DNN_2.

Similarly, DNN_3_1 and DNN_3_2 also have masking layers for cropping each of the body part region BDP_R and the plural body parts region PBDP_R, from the input image IMG_IN or its feature image, and scaling layers for matching the sizes of an image of the cropped body part region and an image of the cropped plural body parts regions with the input of DNN_3.

For DNN_1 to DNN_4, weighting parameters W1 to W4 are set, respectively.

A DNN obtained by connecting the first DNN (DNN_1) and the second DNN (DNN_2) may calculate or estimate a body part region BDP_R of a human body from an input image IMG_IN.

Figure 3:
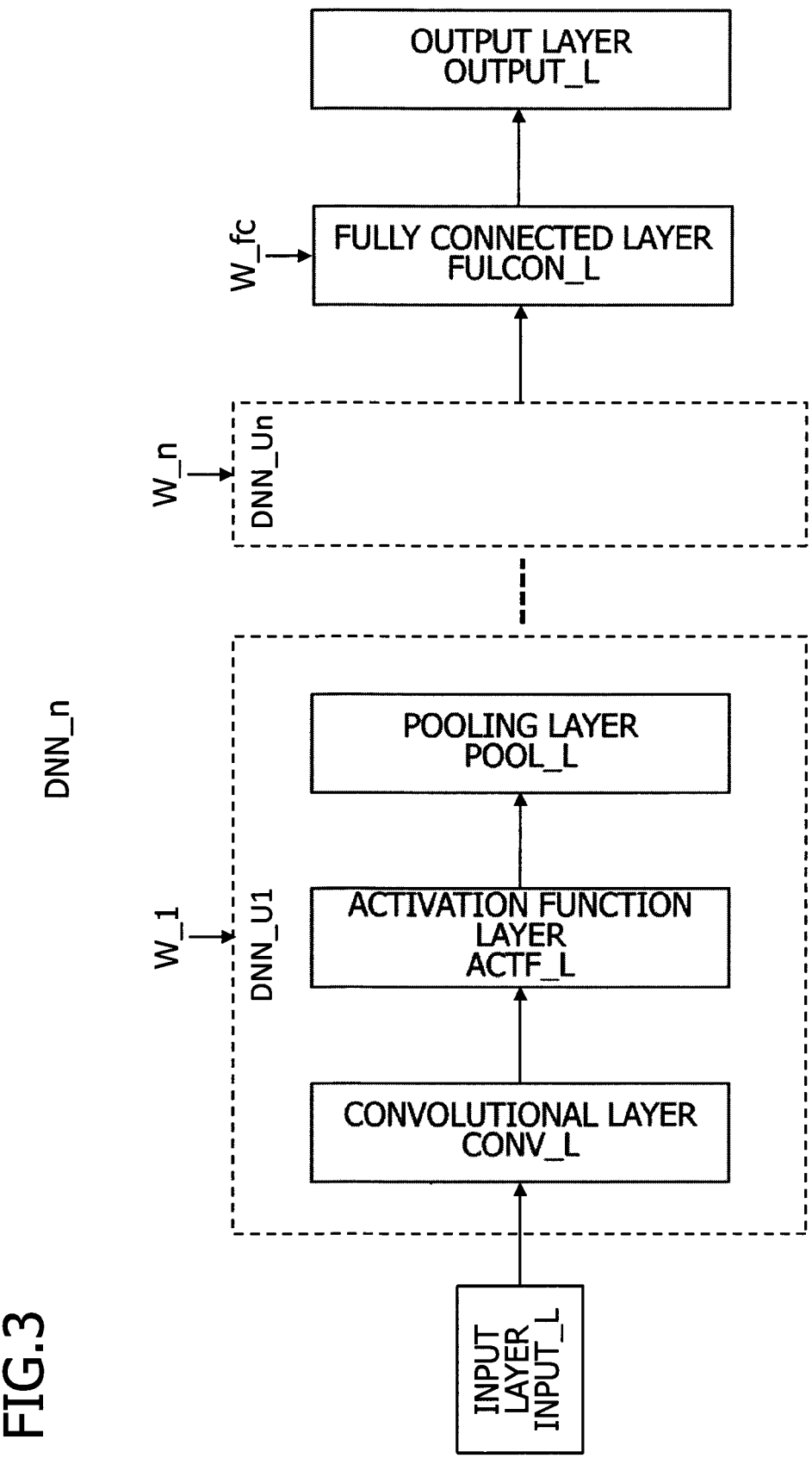
FIG. 3 is a diagram illustrating a configuration example of each DNN_n.

FIG. 3 is a diagram illustrating a configuration example of each DNN_n. Each DNN_n has an input layer INPUT_L, a plurality of DNN units DNN_U1 to DNN_Un, a fully connected layer FULCON_L, and an output layer OUTPUT_L. Each of the DNN units DNN_U1 to DNN_Un has a convolutional layer CONV_L for performing convolution of image data from the input layer with a weight W constituting a filter, an activation function layer ACTF_L for determining the calculation result of the convolutional layer by an activation function, and a pooling layer POOL_L for extracting, for example, the local maximum value of the calculation result. The number of DNN units is tuned as appropriate. The DNN units DNN_U1 to DNN_Un includes intermediate layers.

[Estimation Processing of DNN]

Next, the estimation processing of DNN is described. The calculation or estimation processing of DNN is performed when the above-mentioned processor executes the DNN program 20 in which the DNN parameters 22 have been set.

Figure 4:
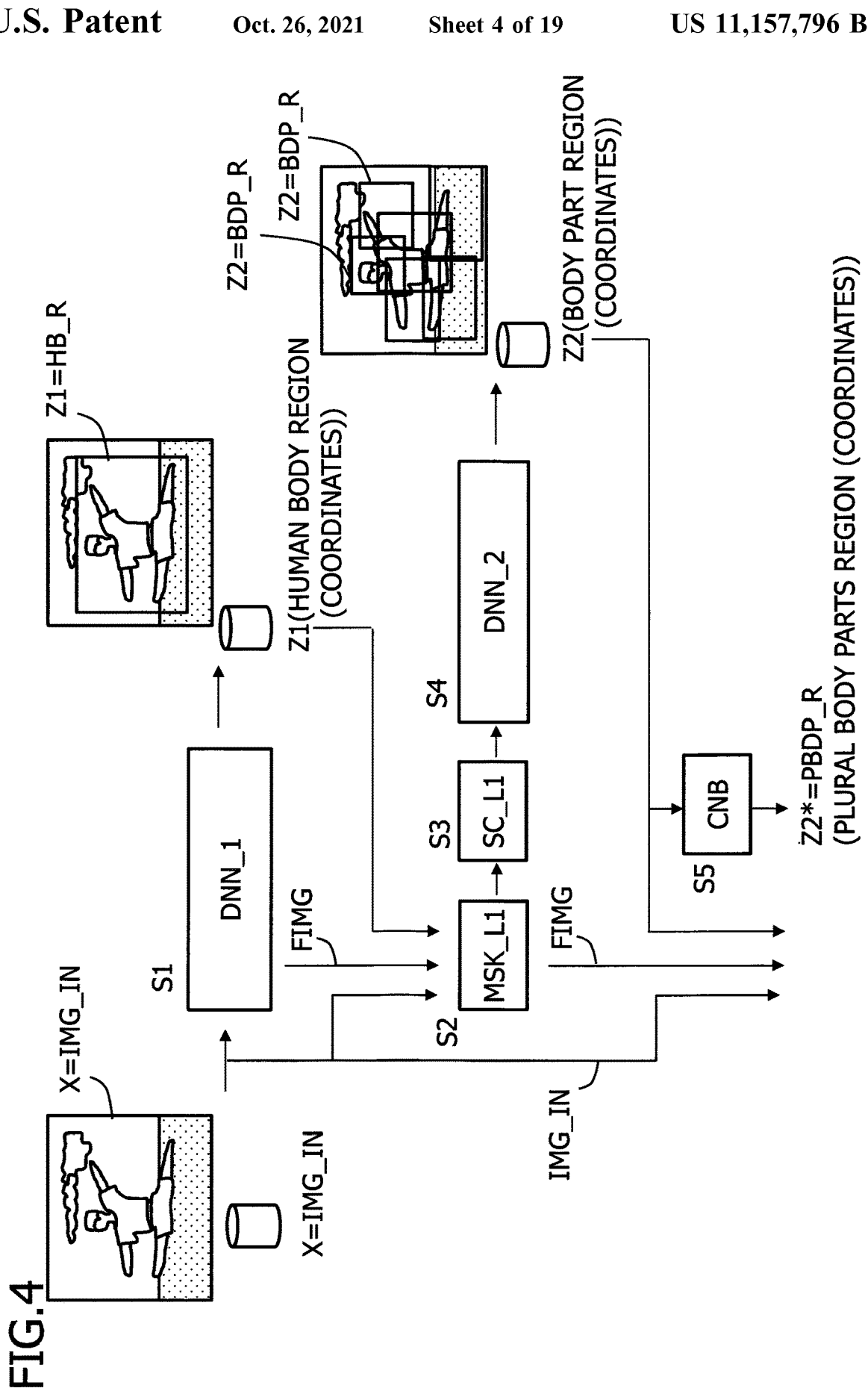
FIG. 4 is a diagram illustrating the estimation processing by DNN_1 and DNN_2.

FIG. 4 is a diagram illustrating the estimation processing by DNN_1 and DNN_2. First, DNN_1 inputs an input image IMG_IN in which a human body or animal body (hereinafter a human body) is included, and calculates or estimates a region where the human body is present or a human body region Z1=HB_R (S1). For example, the human body region HB_R is specified by the upper left coordinates and the lower right coordinates. The human body region HB_R may be specified by the upper left coordinates, the width, and the height. The intermediate layer in DNN_1 generates a feature image FIMG of the input image IMG_IN. For example, the human body region HB_R is a region including almost only a human body, and is a narrow region where the human body is present in the input image.

Next, a masking layer MSK_L1 provided on the input side of DNN_2 crops the human body region HB_R from the input image IMG_IN or its feature image FIMG to generate an image of the human body region (S2). A scaling layer SC_1 changes (for example, enlarges) the size of the image of the human body region so as to match with the size of the input layer of DNN_2 (S3). The masking layer and the scaling layer are described in detail later.

DNN_2 inputs the image of the human body region output from the scaling layer SC_L1, and calculates or estimates body part regions Z2=BDP_R, such as the head, right and left upper extremities (arms), right and left lower extremities (legs), and trunk of the human body (S4). A body part connector CNB generates a plural body parts region Z2*=PBDP_R obtained by connecting a plurality of single body part regions Z2=BDP_R (S5). The connection of the plurality of single body part regions is processing for generating upper left coordinates and lower right coordinates of a rectangular region including the plurality of single body part regions.

Figure 5:
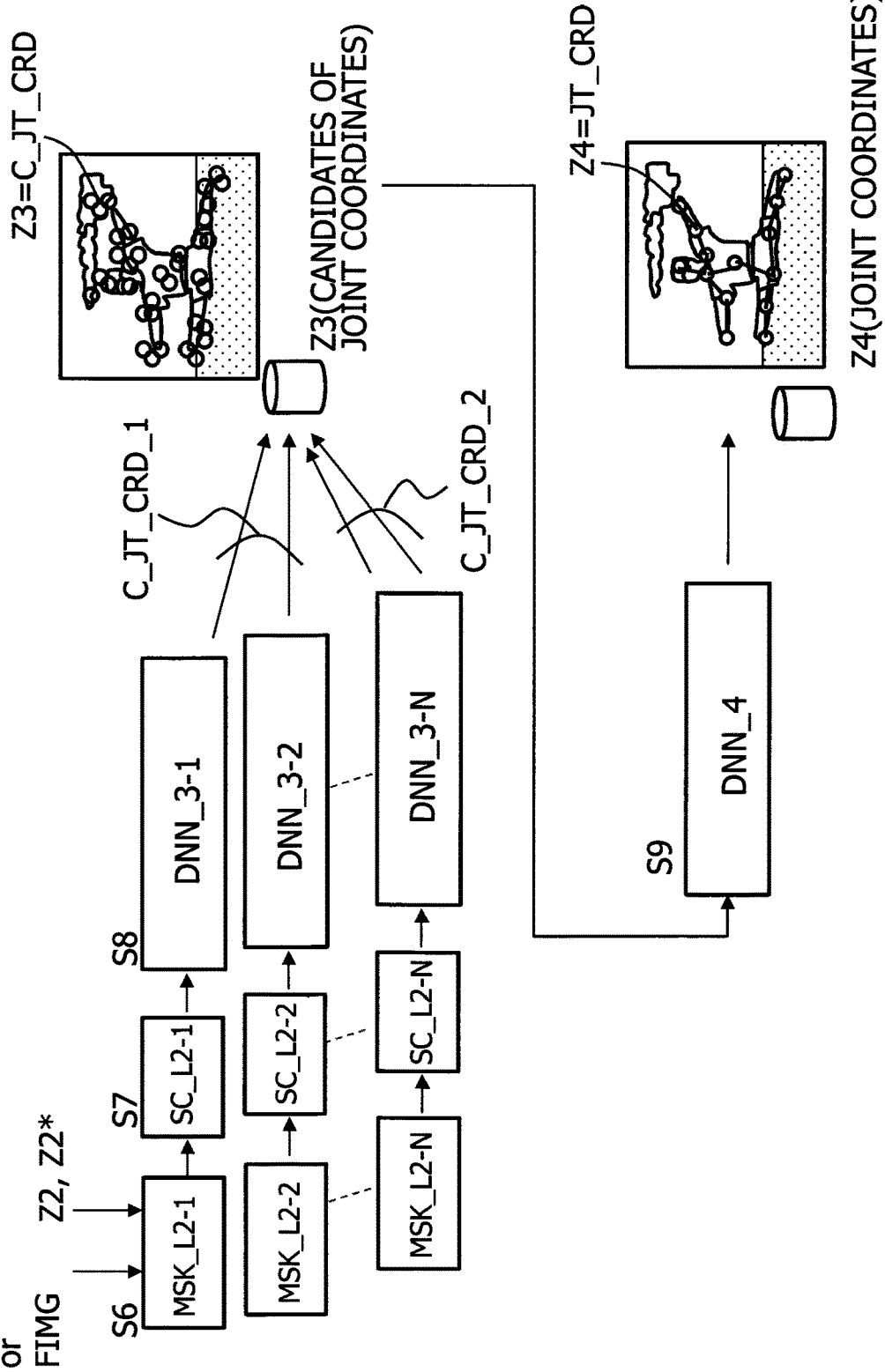
FIG. 5 is a diagram illustrating the estimation processing by DNN_3 and DNN_4.

FIG. 5 is a diagram illustrating the estimation processing by DNN_3 and DNN_4. DNN_3 has a plurality of DNN_3-1 to DNN_3-N respectively corresponding to a plurality of single body parts and a plurality of plural body parts output from DNN_2. Specifically, of the plurality of DNN_3-1 to DNN_3-N, DNN_3 in number corresponding to the number of single body part regions calculate or estimate the positions (coordinates) of joints as candidates in the single body part region from the image of the single body part region. Of the plurality of DNN_3-1 to DNN_3-N, DNN_3 in number corresponding to the number of plural body parts regions calculate or estimate the positions (coordinates) of joints as candidates in the plural body parts region from the image of the plural body parts region.

For example, a masking layer MSK_L2-1 provided on the input side of DNN_3-1 crops the single body part region Z2=BDP_R from the input image IMG_IN or its feature image FIMG to generate an image of the single body part region (S6). A scaling layer SC_L2-1 changes (for example, enlarges) the size of the image of the single body part region so as to match with the size of the input layer of DNN_3-1 (S7).

For example, a masking layer MSK_L2-N provided on the input side of DNN_3-N crops the plural body parts region Z2*=PBDP_R from the input image IMG_IN or its feature image FIMG to generate an image of the plural body parts region (S6). A scaling layer SC_L2-N changes (for example, enlarges) the size of the image of the plural body parts region so as to match with the size of the input layer of DNN_3-N (S7).

For example, DNN_3-1 inputs the image of the single body part region, and calculates or estimates candidates C_JT_CRD_1 of the position (coordinates) of a joint or joints in the single body part region (S8). Similarly, for example, DNN_3-N inputs the image of the plural body parts region, and calculates or estimates candidates C_3T_CRD_2 of the positions (coordinates) of a joint or joints in the plural body parts region (S8).

Finally, DNN_4 inputs candidates Z3=C_JT_CRD of the joint coordinates, and calculates or estimates the position (coordinates) Z4=JT_CRD of the joint of the human body from which duplicated joint coordinates have been deleted (S9).

Figure 6:
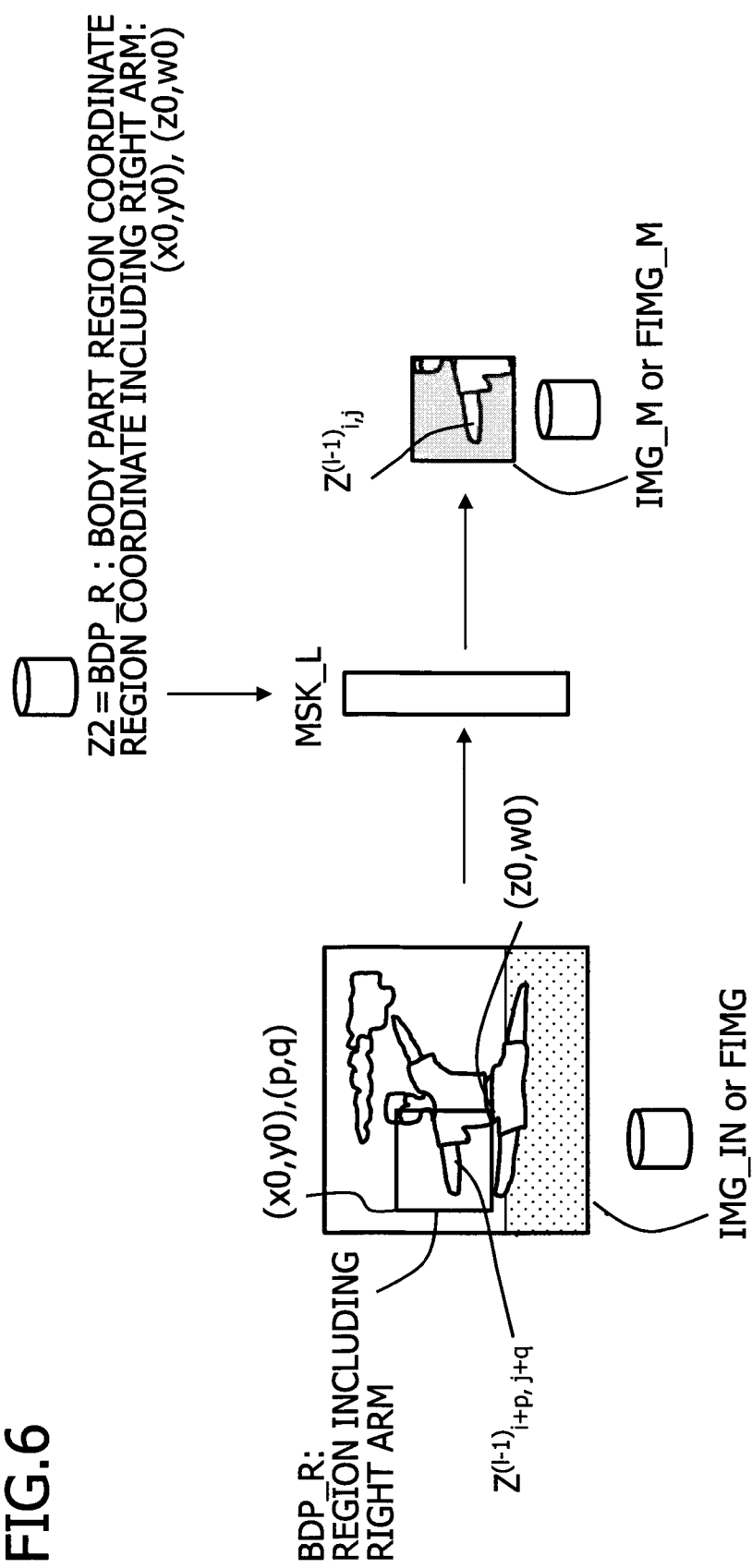
FIG. 6 is a diagram for describing a masking layer.

FIG. 6 is a diagram for describing a masking layer. This masking layer MSK_L is an example of the masking layer in FIG. 4, and crops a body part region Z2=BDP_R of the right arm (upper extremity) from the input image IMG_IN or the feature image FIMG to output an image IMG_M or FIMG_M of the body part region. The masking layer MSK_L performs the following calculation.

$$Z_{i,j,m}^{(l)} = \begin{cases} Z_{i+p,j+q,m}^{(l-1)} & (i+p, j+q \in \text{BDP\_R}) \\ 0 & (i+p, j+q \notin \text{BDP\_R}) \end{cases} \quad [\text{Math. 1}]$$

BDP_R: body part region
(p,q): coordinates as starting points of BDP_R

Specifically, the upper left coordinates in the input image IMG_IN or the feature image FIMG as starting points of the body part region BDP_R are denoted by (p,q), the positions in the row and column directions in the body part region are denoted by i and j, respectively, and pixels of the input image IMG_IN or the feature image FIMG input to the masking layer are denoted by $z^{(l-1)}_{i+p,j+q}$. In this case, pixels $z^{(l)}_{i,j}$ of the image IMG_M or FIMG_M output from the masking layer are as expressed by Math. 1. In other words, the pixels $z^{(l)}_{i,j}$ of the output image become pixels $z^{(l-1)}_{i+p,j+q}$ of the input image or the feature image when the position i+p,j+q is within the body part region BDP_R, and becomes 0 when the position i+p,j+q is outside the body part region BDP_R.

In the example in FIG. 6, the masking layer MSK_L outputs the masked image IMG_M or FIMG_M obtained by cropping the region (body part region BDP_R) including the right arm from the input image IMG_IN or the feature image FIMG. The symbol M is the number of the input image or the feature image.

Figure 7:
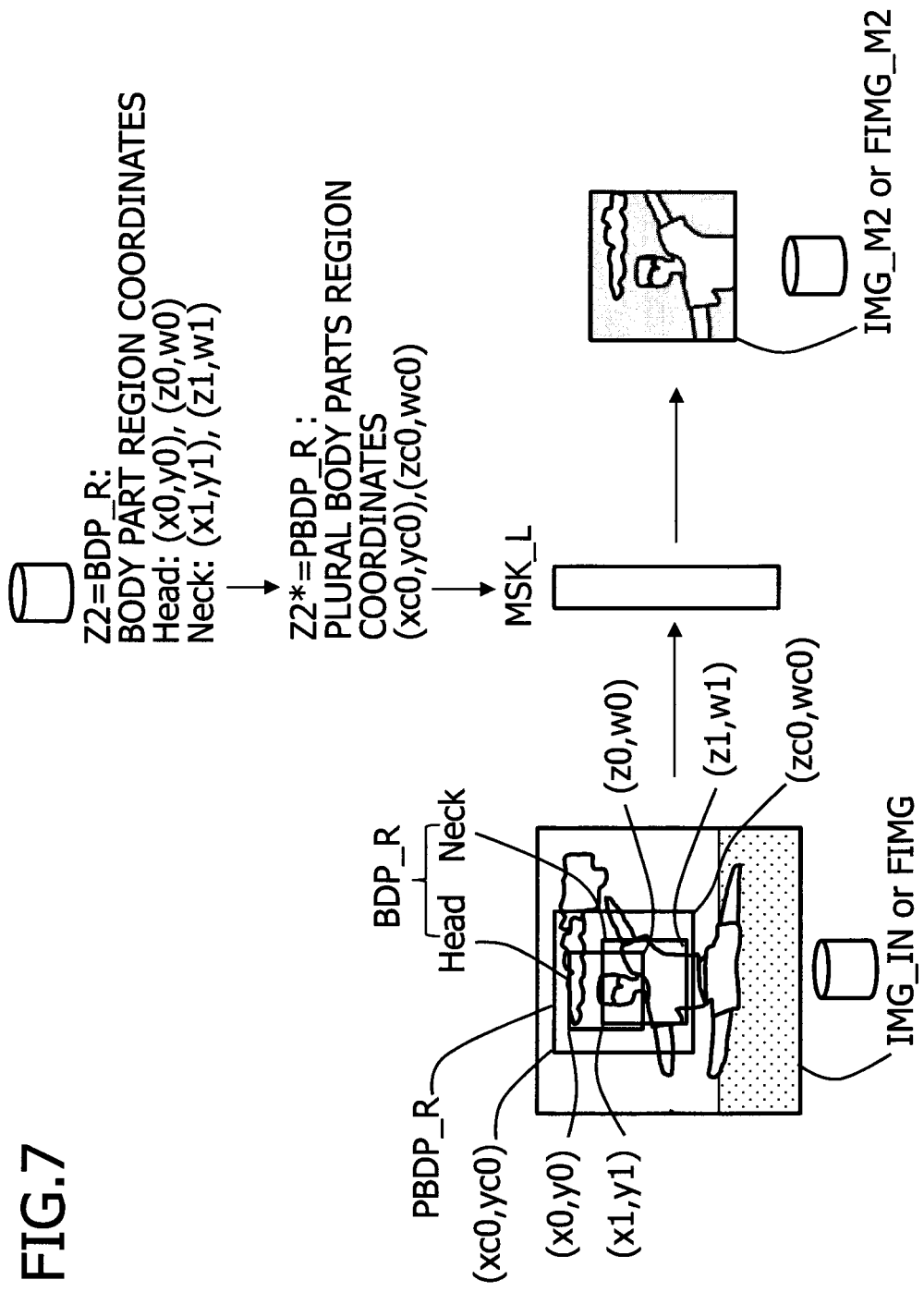
FIG. 7 is a diagram for describing a masking layer.

FIG. 7 is a diagram for describing a masking layer. This masking layer MSK_L is one of the masking layers in FIG. 5, and outputs an image IMG_M2 or FIMG_M2 of a plural body parts region obtained by cropping a plural body parts region Z2*=PBDP_R including both of the head part Head and the neck part Neck from the input image IMG_IN or the feature image FIMG. The plural body parts region Z2*=PBDP_R is a region including two single body part regions Z2=BDP_R.

Figure 8:
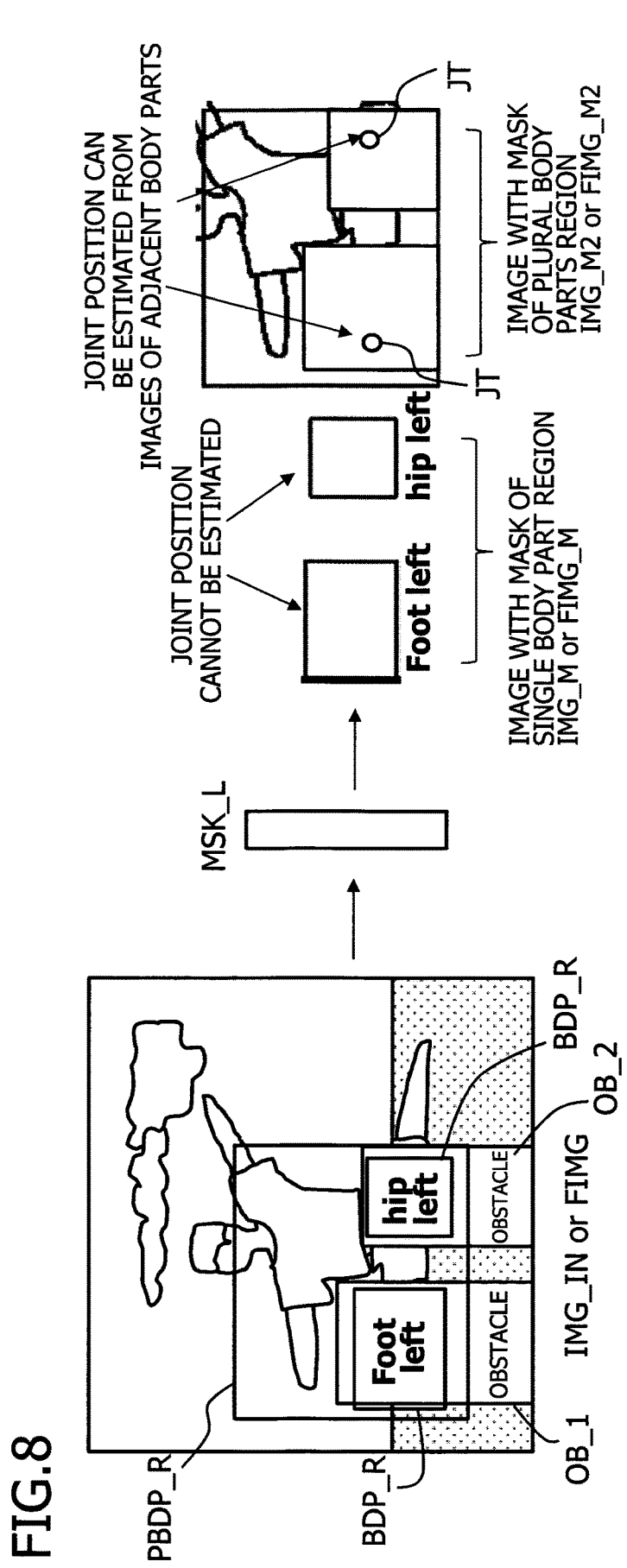
FIG. 8 is a diagram illustrating how the masking layer crops a single body part region and a plural body parts region from an image.

FIG. 8 is a diagram illustrating how the masking layer crops a single body part region and a plural body parts region from an image. In an input image IMG_IN or a feature image FIMG illustrated in FIG. 8, the left leg and the left hip of a human body are hidden by obstacles OB_1 and OB_2, and occlusion occurs. Thus, if the masking layer MSK_L crops the single body part region BDP_R from the input image IMG_IN or the feature image FIMG, the cropped image IMG_M or FIMG_M includes no body part image at all or almost no body part image. As a result, the next DNN_3 cannot detect a joint position in the single body part region, or the detection accuracy decreases.

Meanwhile, when the masking layer SK_L crops the plural body parts region PBDP_R from the input image IMG_IN or the feature image FIMG, the cropped image IMG_M2 or FIMG_M2 does not include images of body parts of the left leg and the left hip, but includes images of adjacent body parts. In other words, it is highly probable that the plural body parts region PBDP_R includes images of body parts other than the body parts hidden by occlusion. As a result, the next DNN_3 can detect a joint position in the adjacent body part, and estimate, from the joint positions, joint positions in the body part regions of the left leg and the left hip which are hidden by occlusion, or the estimation accuracy can be improved.

In this embodiment, as described later, input images in which occlusion is included and input images in which occlusion is not included are used for teaching data in the DNN learning step. Consequently, DNN can detect joint positions in both of the input images in which occlusion is included and the input images in which occlusion is not included.

When images including occlusion are used for teaching data for learning, DNN can estimate a joint position even in an image including occlusion. However, when the proportion of occlusion is high, the estimation accuracy of joint positions decreases. In particular, in the case of an image including occlusion, when a single body part region is cropped from the image, the proportion of occlusion occupied in the cropped image is high, and the estimation accuracy of joint positions decreases. On the contrary, when a plural body parts region is cropped from the image, the proportion of occlusion occupied in the cropped image decreases, and the estimation accuracy of joint positions becomes higher. In the case of an image including no occlusion, a single body part region is advantageous in that a cropped image of the single body part region becomes smaller and simpler than a cropped image of a plural body parts region, and the estimation accuracy of joint positions increases.

As described above, in this embodiment, in the DNN learning step, images including occlusion and images including no occlusion are used as teaching data, and in the DNN, joint positions are estimated from cropped images in both a single body part region and a plural body parts region. Consequently, the learned DNN can estimate joint positions from both an image including occlusion and an image including no occlusion.

In this embodiment, the masking layer in the DNN crops a body part region or a plural body parts region from the input image IMG_IN or the feature image FIMG, and calculates or estimates joint positions in a single body part or plural body parts from the cropped image, that is, the masked image. The input image or the feature image includes a background image other than a human body, but the DNN crops a region where the human body is present in the input image or the feature image, and further crops a single body part region or a plural body parts region in the image of the region where the human body is present. As a result, DNN_3 calculates or estimates joint positions from the image with no noise. Thus, the estimation accuracy of joint positions can be improved.

Figure 9:
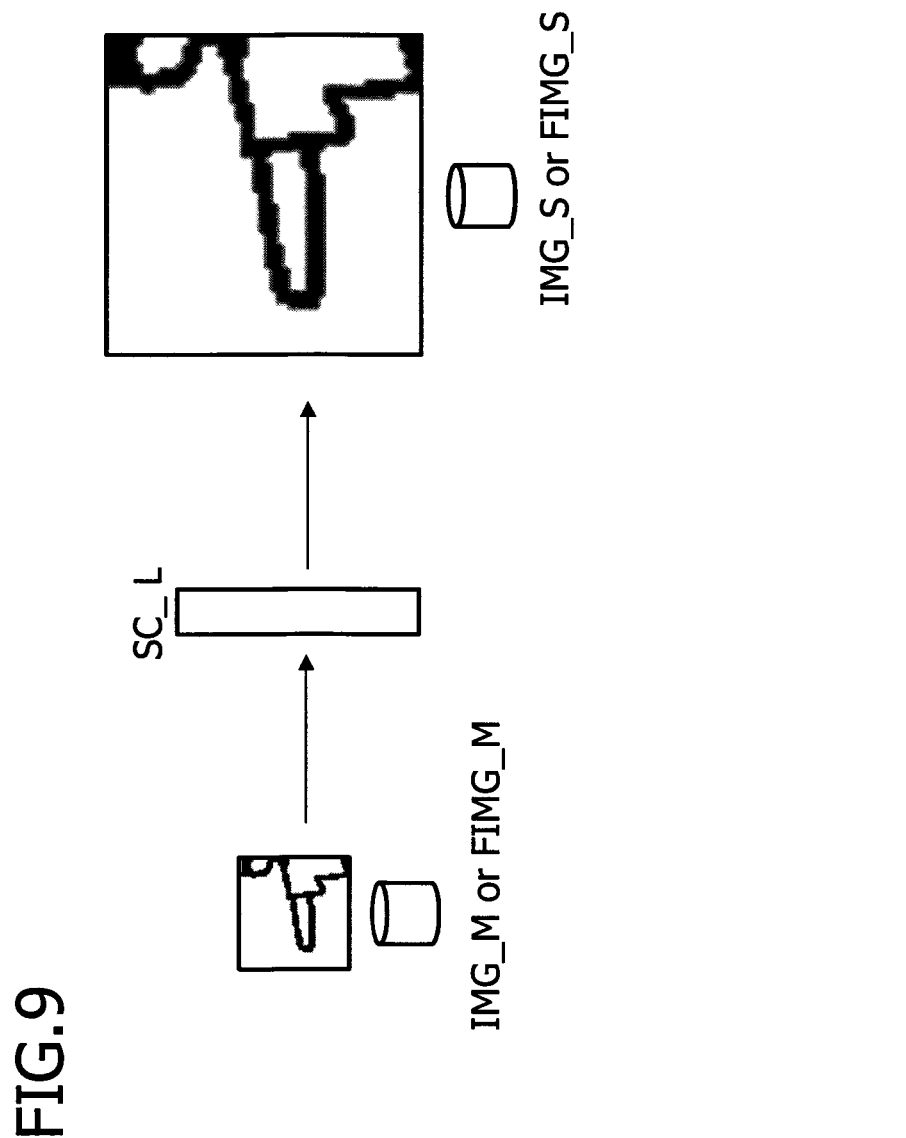
FIG. 9 is a diagram for describing a scaling layer.

FIG. 9 is a diagram for describing a scaling layer. A scaling layer SC_L changes the size of the input masked image IMG_M or FIMG_M so as to match with the size of an input layer of the subsequent DNN. Specifically, as indicated by the following mathematical expression, the scaling layer SC_L converts a pixel $z^{(l-1)}_{i,j}$ at a position i in the row direction and a position j in the column direction of the masked image IMG_M or FIMG_M into a pixel $z^{(l)}_{a*i,b*j}$ at a position a*i in the row direction and a position b*j in the column direction of a scaled image IMG_S or FIMG_S.

$$z_{i,j,m}^{(l)} = z_{a\cdot i, b\cdot j, m}^{(l-1)}$$ [Math. 2]

a, b: scaling factors, determined by size of BDP_R
where a, b are scaling factors in the row and column direction.

[Learning of DNN]

Next, the learning of DNN in this embodiment is described. In deep learning, a more desired DNN is generated by improving the configuration of DNN and a learning method. DNN in this embodiment has a plurality of DNN_1 to DNN_4, and hence the learning of each of DNN_1 to DNN_4 is executed such that each of DNN_1 to DNN_4 can perform each desired operation.

Figure 10:
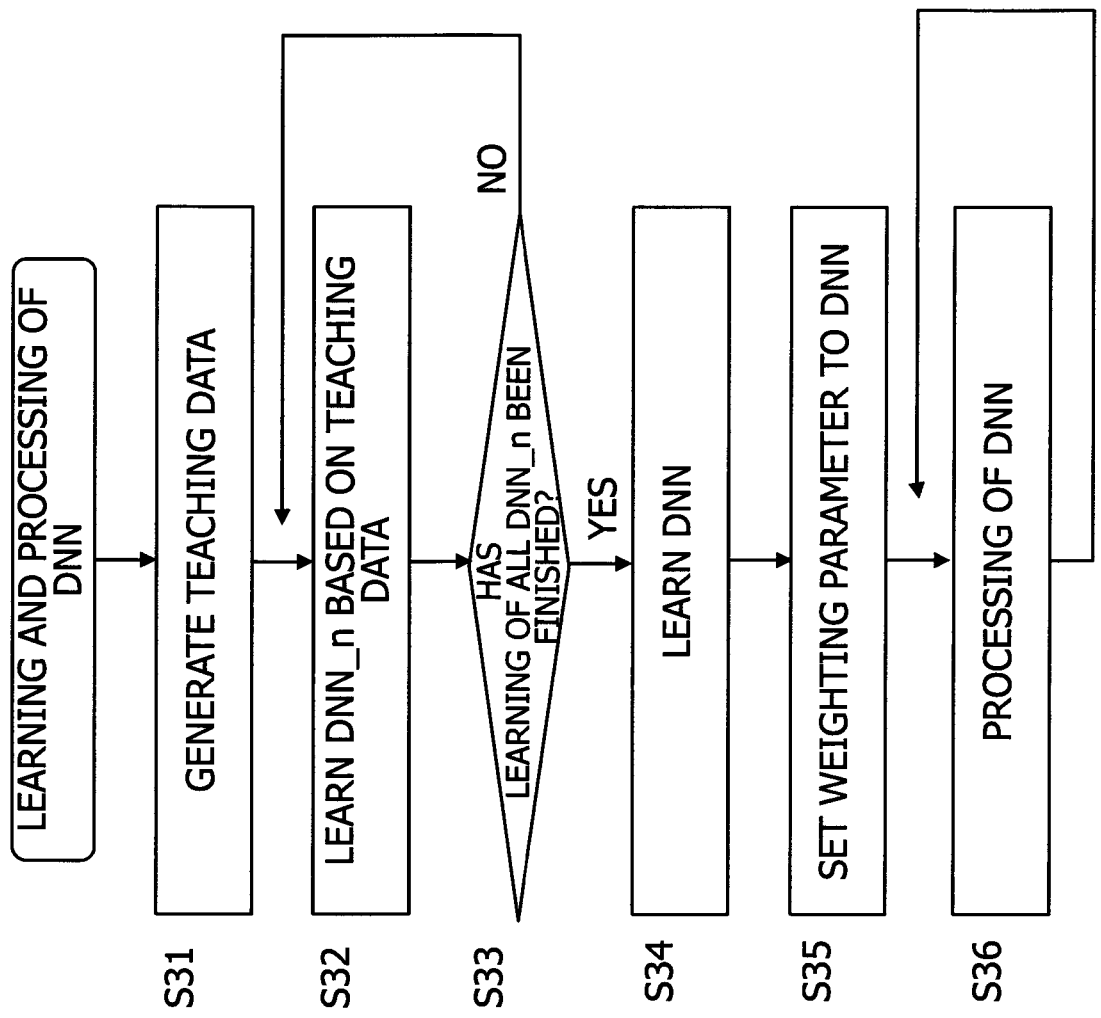
FIG. 10 is a flowchart illustrating the outline of the learning of DNN and subsequent processing.

FIG. 10 is a flowchart illustrating the outline of the learning of DNN and subsequent processing. In the learning of DNN, as illustrated in FIG. 1, the processor 10 executes the DNN learning program 24 while using teaching data 26.

As illustrated in FIG. 10, the processor 10 generates teaching data used for the learning of each of DNN_1 to DNN_4 in the DNN illustrated in FIG. 2 (S31). The teaching data to be given is, for example, information on the input images IMG_IN and the positions of joints included in the input images. Information on joint positions of a human body is correct data of teaching data.

In Step S31, the processor generates correct data used for learning of DNN_1 to DNN_3 in advance from correct data of given teaching data. In the learning of DNN_1 to DNN_3, the processor uses a predetermined number of teaching data randomly selected from a set of teaching data. Thus, it is desired to generate correct data used for learning of DNN_1 to DNN_3 in advance for all pieces of given teaching data.

The processor 10 further sequentially executes the learning of each DNN_1 to DNN_4 by using teaching data (S32, S33). The processor determines optimal parameters for each DNN_1 to DNN_4 by this learning. When the learning of all of DNN_1 to DNN_4 is finished (YES in S33), the processor executes learning of DNN in which all DNN_1 to DNN_4 are connected (S34). After that, the processor sets optimal parameters determined by the learning to DNN_1 to DNN_4 (S35). The learning step is finished in this manner.

The processor executes arithmetic operation of the DNN for which the parameter has been set, and calculates or estimates information on joint positions in an image to be processed (S36). The processor repeats the execution S36 of the arithmetic operation of DNN each time an image to be processed is input.

Next, pieces of the processing S31 to S35 in FIG. 10 are described in detail.

[Generation of Teaching Data S31]

Figure 11:
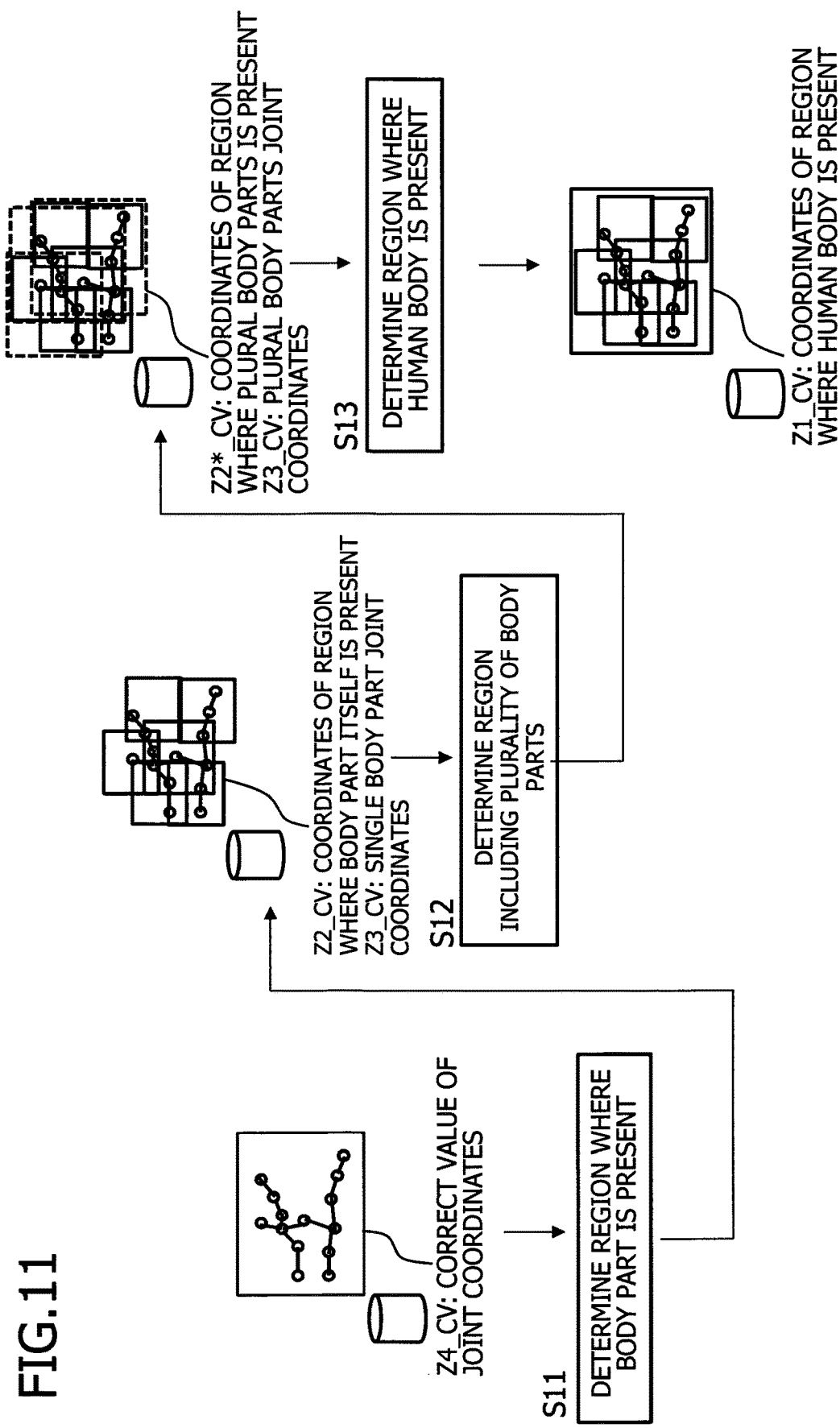
FIG. 11 is a diagram illustrating the processing S31 for generating teaching data used for learning of each of DNN_1 to DNN_4.

FIG. 11 is a diagram illustrating the processing S31 for generating teaching data used for learning of each of DNN_1 to DNN_4. The processor 10 executes a DNN learning program to define a square centered at a joint of a correct value Z4_CV of a joint position, which is correct data of teaching data 26, and detect a correct value Z2_CV of coordinates of a region where a single body part is present from the square (S11). The coordinates of the region are, for example, coordinates of the upper left and the lower right of a rectangular region. The region may be defined by coordinates of the upper left of a rectangular region and the width and height thereof.

Simultaneously, the processor 10 extracts coordinates of joints in the correct value Z2_CV of the region Z2_CV where the single body part is present, and generates a correct value Z3_CV of a joint coordinate candidate of the single body part (S11).

The processor 10 detects a region including a plurality of the regions where the single body part is present as a correct value Z2*_CV of coordinates of a plural body parts region where plural body parts are present (S12).

Simultaneously, the processor 10 extracts coordinates of joints in the correct value Z2*_CV of the region where the plural body partss are present, and generates a correct value Z3_CV of a joint coordinate candidate of the plural body parts (S12).

Further, the processor detects a region including all of correct values Z2_CV of coordinates of the region of the single body part and correct values Z2*_CV of coordinates of the region of the plural body parts as correct values Z1_CV of coordinates of the region where the human body is present (S13).

The processor 10 performs Steps S11, S12, and S13 for all pieces of teaching data, and generates, for all pieces of teaching data, correct values Z3_CV of joint coordinate candidates of the single body part and the plural body parts, correct value Z2_CV of coordinates of the region of the single body part, correct value Z2*_CV of coordinates of the region of the plural body parts, and correct value Z1_CV of coordinates of the region where the human body is present.

Of all pieces of teaching data, a first set is used as teaching data for DNN_1, a second set is used as teaching data for DNN_2, a third set is used as teaching data for DNN_3, and a fourth set is used as teaching data for DNN_4.

The correct value Z1_CV of the coordinates of the region where the human body is present is used as correct value data of the teaching data for DNN_1, and the correct value Z2_CV of the coordinates of the region where the single body part is present is used as correct value data of the teaching data for DNN_2. The correct values Z3_CV of joint coordinate candidates of the single body part and the plural body parts are used as correct values of the teaching data for DNN_3.

[Learning of DNN_1]

Figure 12:
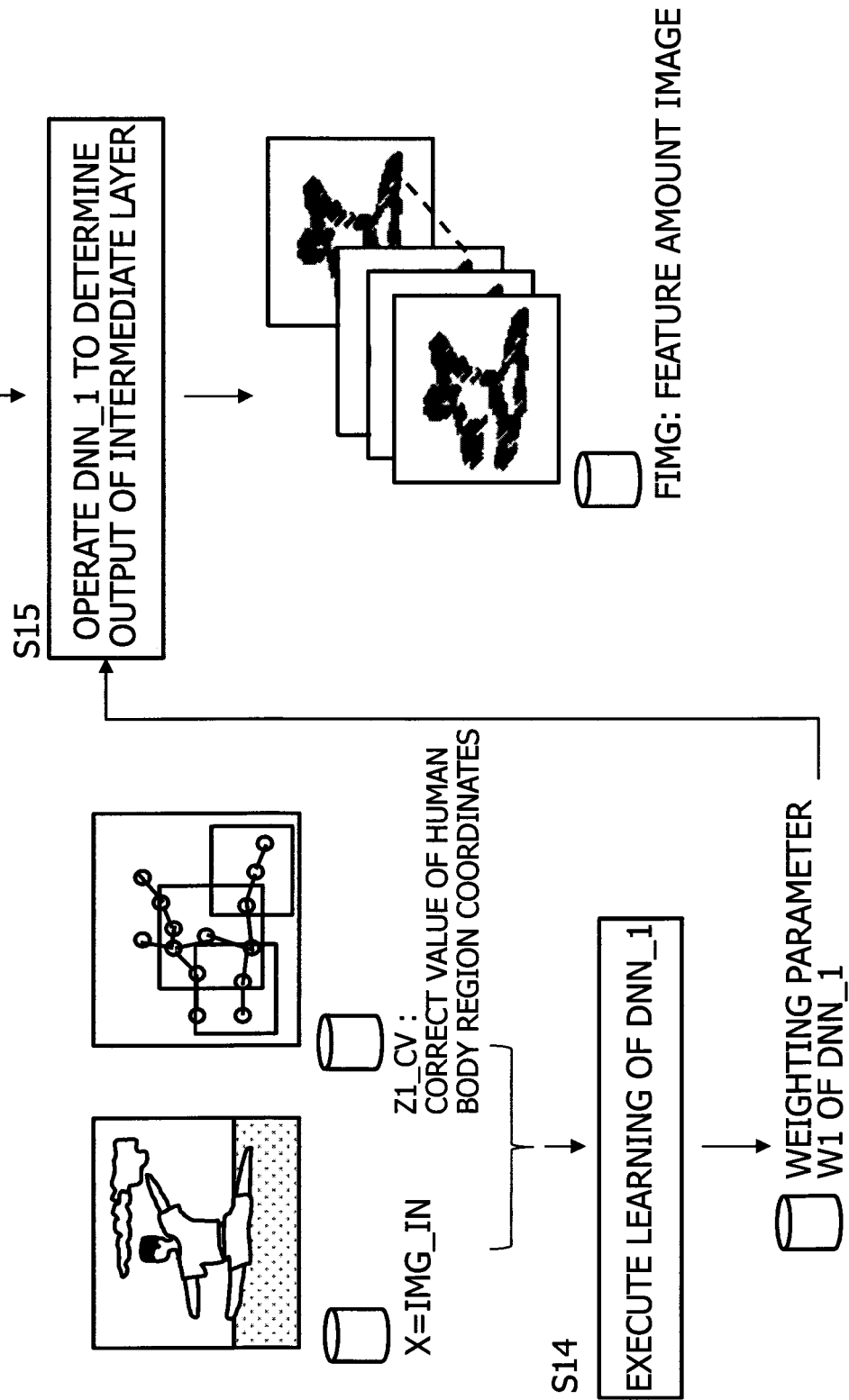
FIG. 12 is a diagram for describing the learning of DNN_1.

FIG. 12 is a diagram for describing the learning of DNN_1. The processor executes the learning of DNN_1 by using an input of a first set of teaching data as an input image IMG_IN and a correct value as correct value Z1_CV of coordinates of a human body region (S14). The processor performs the learning by, for example, a method called stochastic gradient descent or minibatch. In this learning step, the processor optimizes a parameter (such as a weighted value) W1 of DNN_1.

The processor further sets the optimized parameter W1 of DNN_1 to DNN_1, executes arithmetic operation of DNN_1 for an input image IMG_IN of a second set of teaching data to be used next, and generates a feature image FIMG of the input image IMG_IN from an intermediate layer of DNN_1 (S15). The feature image FIMG is output from the intermediate layer that performs convolution such as edge detection of the input image. The features of the image are emphasized, which may be preferable than the input image as an image for subsequent DNN_2 and DNN_3.

Figure 13:
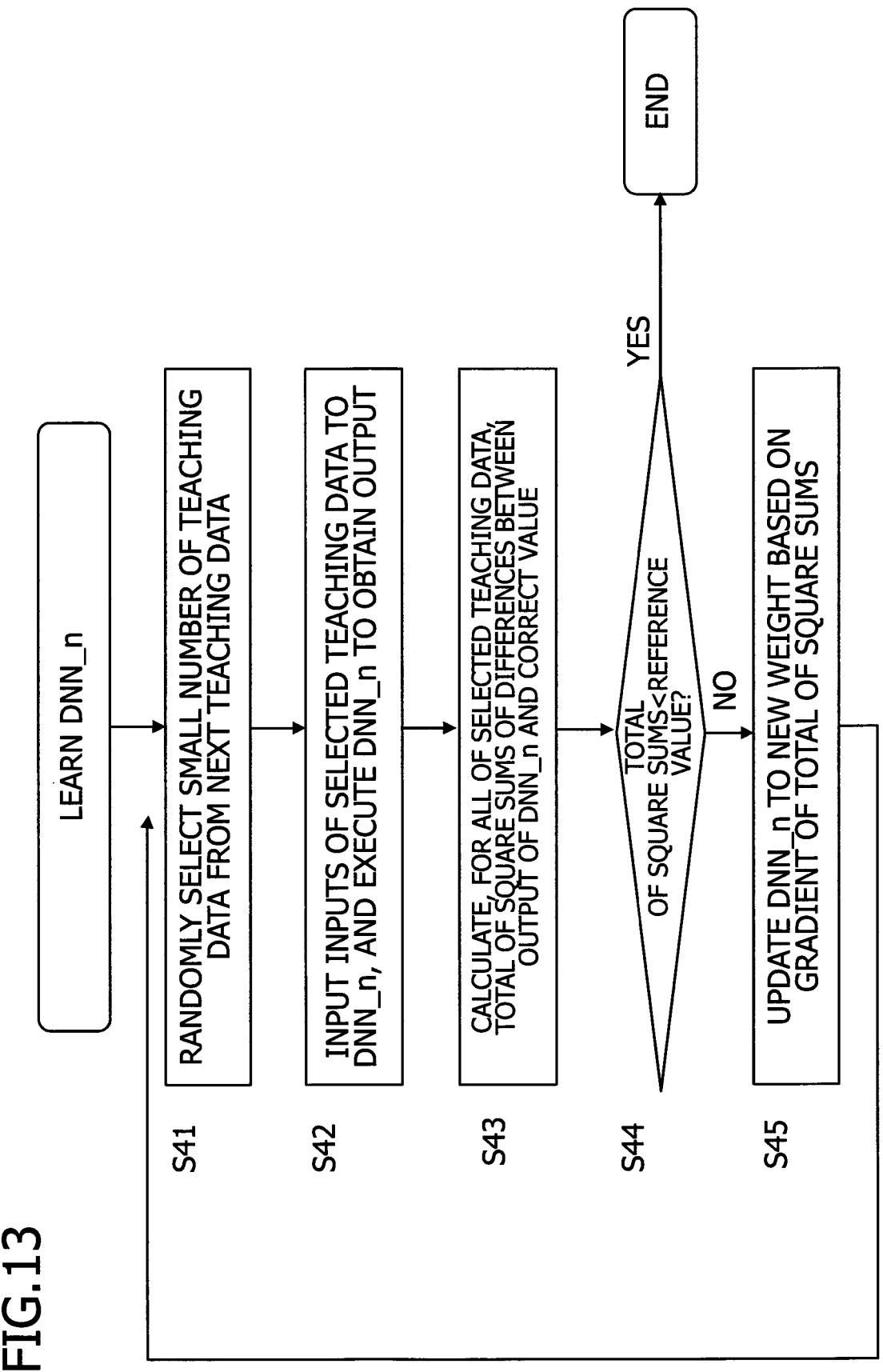
FIG. 13 is a flowchart illustrating the outline of stochastic gradient descent or minibatch, which is one learning method in this embodiment.

FIG. 13 is a flowchart illustrating the outline of stochastic gradient descent or minibatch, which is one learning method in this embodiment. In this learning method, the processor randomly selects a small number of (for example, 10) teaching data from a large number of teaching data (S41), and executes arithmetic operation of DNN_n by inputting the inputs of the selected small number of teaching data to DNN_n to obtain an output (S42). The processor calculates, for all of the selected small number of teaching data, the total of square sum of the difference between the output of DNN_n and correct value (S43). The processor determines whether the total of the square sums is less than a reference value (S44). When the total of the square sums is not less than the reference value (NO in S44), the processor determines a new parameter of DNN_n on the basis of the gradient of the total of the square sums, and sets the new parameter to DNN_n (S45). Until the determination of Step S44 becomes YES, the processor repeats the processing of Steps S41 to S44 by using different small numbers of teaching data. When the determination of Step S44 becomes YES, the processor outputs the parameter at this time as an optimized parameter of DNN_n.

The above-mentioned learning method can suppress the number of teaching data learned by DNN_n.

[Learning of DNN_2]

Figure 14:
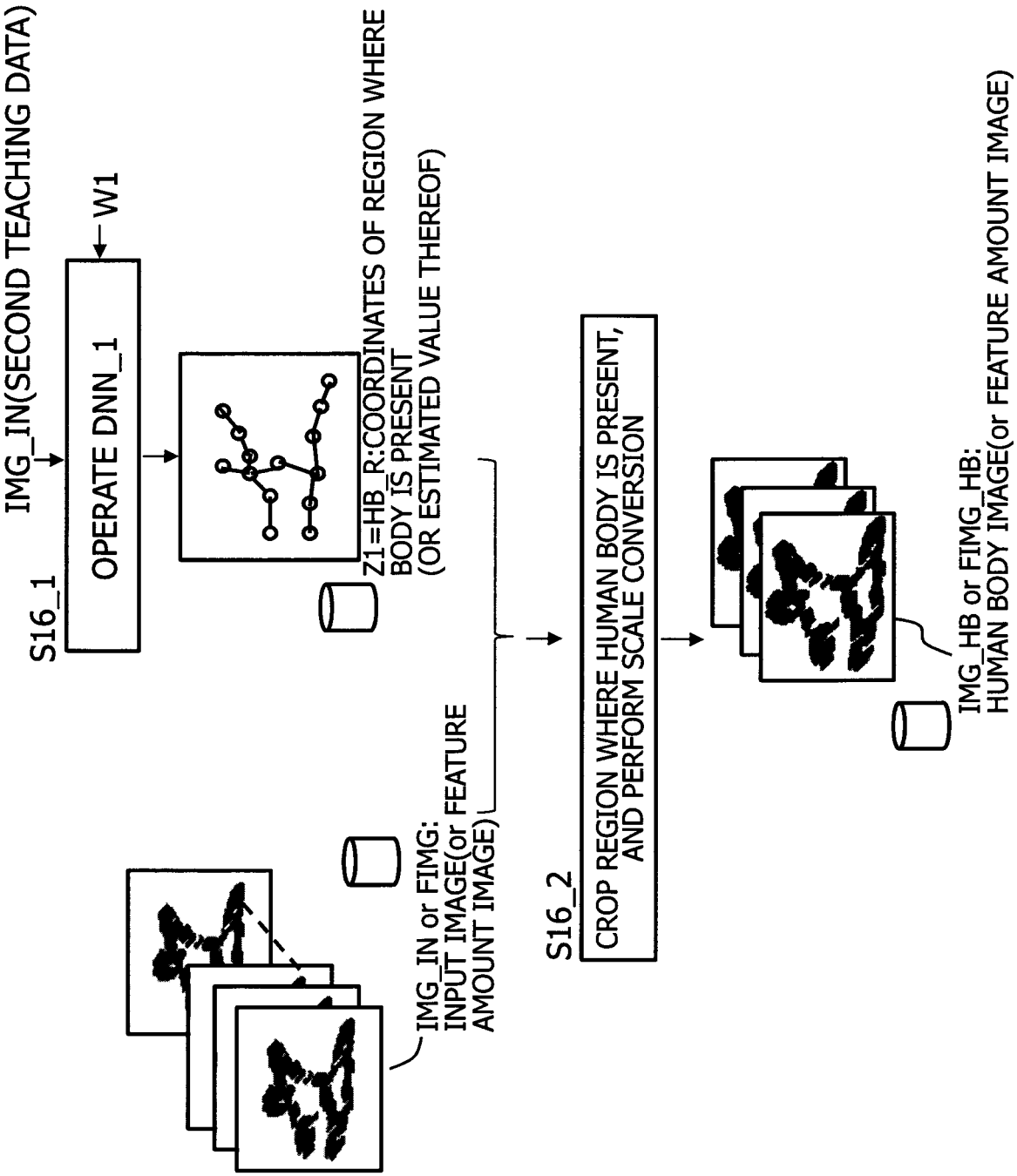
FIG. 14 is a flowchart illustrating the processing of a masking layer MSK_L1 and a scaling layer SC_L1 for generating an image of a human body or an image of a feature amount of a human body to be input to DNN_2.

FIG. 14 is a flowchart illustrating the processing of a masking layer MSK_L1 and a scaling layer SC_L1 for generating an image of a human body or an image of a feature amount of a human body to be input to DNN_2. The processor inputs input images IMG_IN of a second set of teaching data to be used next, executes arithmetic operation of DNN_1 for which the optimization parameter W1 determined in Step S14 has been set, and estimates coordinates Z1=HB_R of a region where the human body is present (S16_1).

The processor executes arithmetic operation of the masking layer MSK_L1 and the scaling layer SC_L1, crops the human body region Z1=HB_R from the input image IMG_IN or its feature image FIMG of the above-mentioned second set of teaching data, and further performs scale conversion (S16_2). In this manner, the processor generates human body images IMG_HB or human body feature images FIMG_HB of the second set of teaching data. These images are used as inputs of teaching data in the learning of DNN_2.

Instead of the coordinates Z1=HB_R of the region where the human body is present, which is determined in Step S16_1 described above, correct values Z1_CV of coordinates of the region where the human body is present in the second set of teaching data, which are generated in the step for generating correct values in FIG. 11, may be used.

This masking processing can delete a background image unrelated to the human body from the input images or the feature images. Consequently, the accuracy of subsequent estimation or calculation of joints can be improved.

Figure 15:
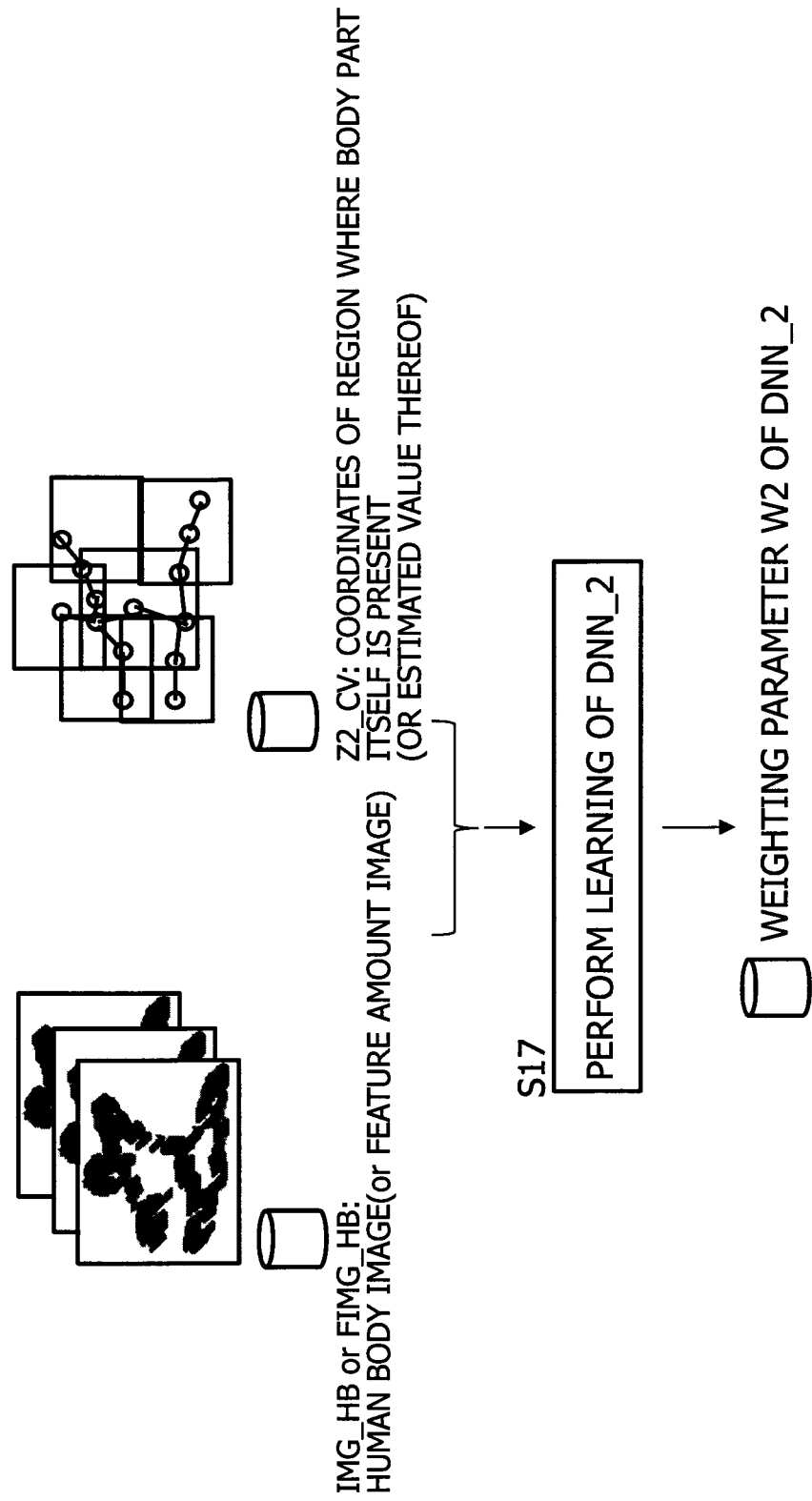
FIG. 15 is a diagram for describing the learning of DNN_2.

FIG. 15 is a diagram for describing the learning of DNN_2. The processor executes the learning of DNN_2 by using inputs of a second set of teaching data as images IMG_HB of a human body or feature images FIMG_HB of a human body in input images generated in Step S16_2 in FIG. 14, and correct values correct values Z2_CV of coordinates of the region where the single body part is present determined in S11 in FIG. 11 (S17). The processor performs the learning by the above-mentioned stochastic gradient descent or minibatch. In this learning step, the processor optimizes a parameter (such as a weighted value) W2 of DNN_2.

[Learning of DNN_3]

Figure 16:
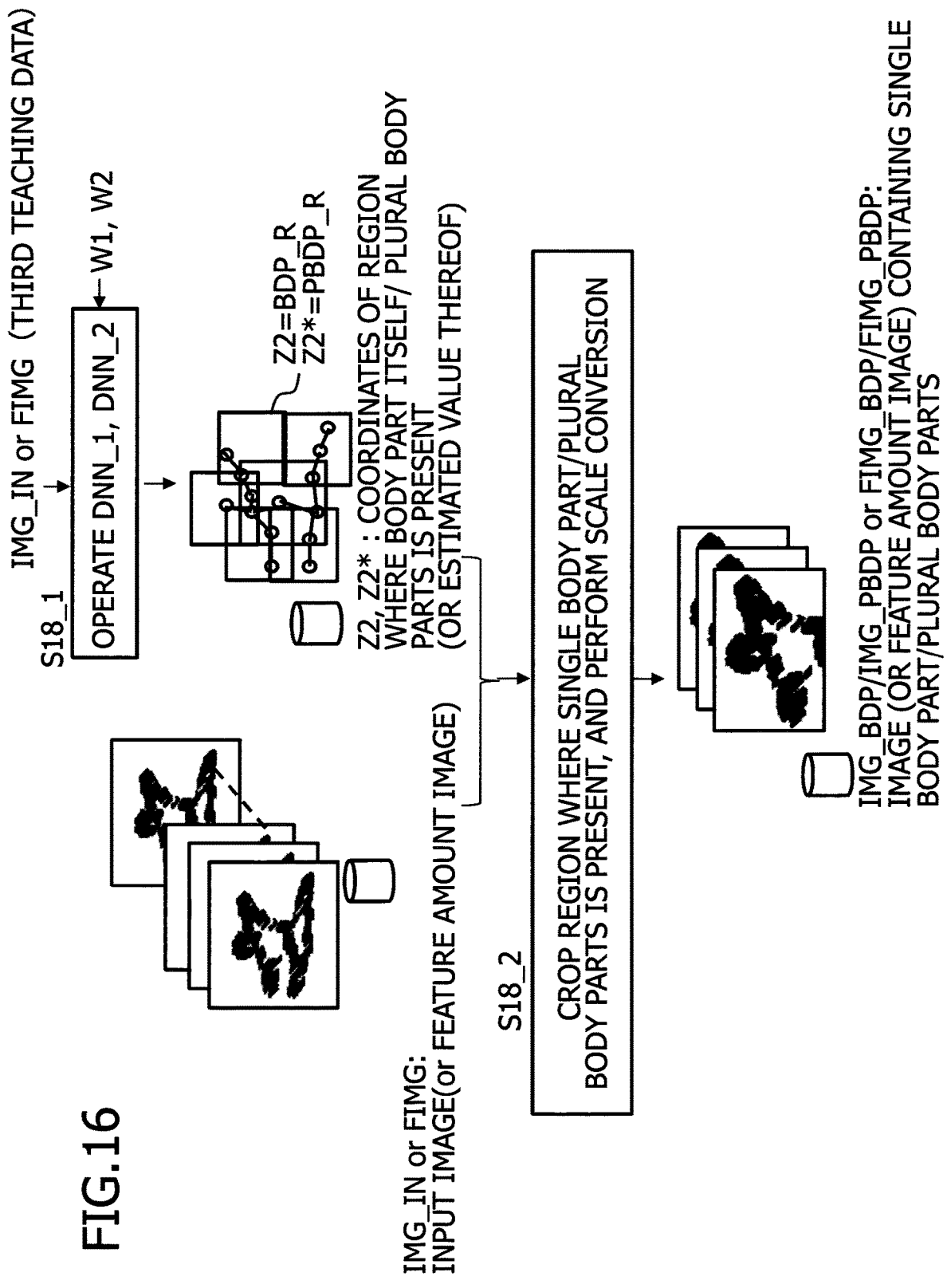
FIG. 16 is a flowchart illustrating the processing of a masking layer MSK_L2 and a scaling layer SC_L2.

FIG. 16 is a flowchart illustrating the processing of a masking layer MSK_L2 and a scaling layer SC_L2. The processor inputs input images IMG_IN or feature images FIMG of a third set of teaching data, executes arithmetic processing of DNN_1 for which the optimization parameter W1 has been set and DNN_2 for which the optimization parameter W2 has been set, and estimates coordinates Z2=BDP_R of a region where a single body part is present (S18_1).

Using the same method as in Step S12 in FIG. 11, the processor further generates coordinates Z2*=PBDP_R of a region where a plural body partss obtained by combining the single body part regions are present.

Instead of Step S18_1 described above, correct values Z2_CV of coordinates of the region where a single body part is present and correct values Z2*_CV of coordinates of the region where a plural body parts is present in a third set of teaching data, which are determined in Step S11 and S12 in FIG. 11 may be used.

The processor executes arithmetic operation of the masking layer MSK_L2 and the scaling layer SC_L2, crops the single body part region Z2=BDP_R and the plural body parts region Z2*=PBDP_R from the input image IMG_IN or its feature image FIMG of a third set of teaching data, and performs scale conversion (S18_2). In this manner, the processor generates a single body part image IMG_BDP and a plural body parts image IMG_PBDP extracted from the input image IMG_IN of the third set of teaching data or a single body part feature image FIMG_BDP or a plural body parts feature image FIMG_PBDP extracted from the feature image FIMG. These images are used as inputs of teaching data in the learning of DNN_3.

Figure 17:
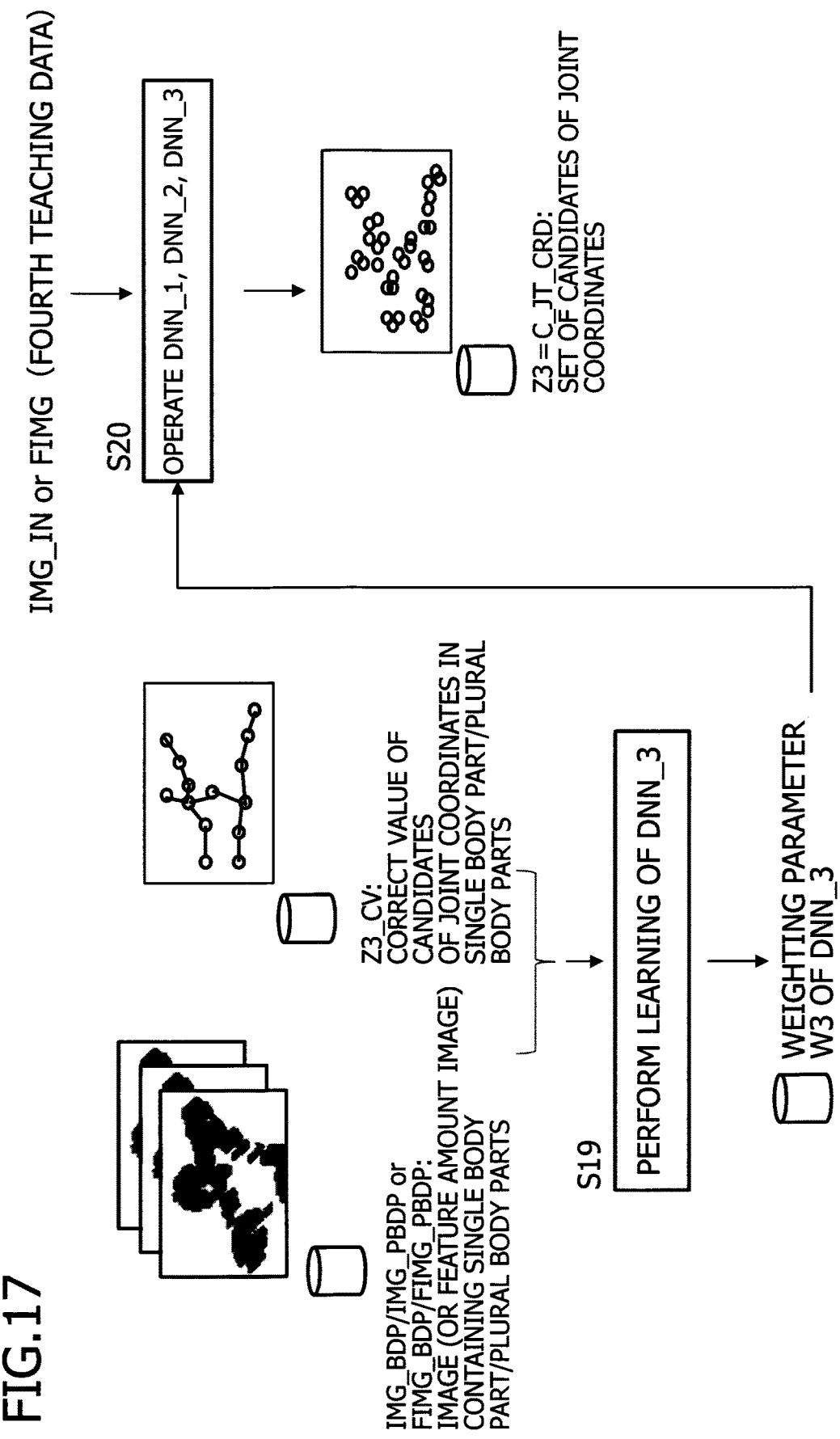
FIG. 17 is a diagram for describing the learning of DNN_3.

FIG. 17 is a diagram for describing the learning of DNN_3. The processor executes learning of DNN_3 (S19) by using inputs of a third set of teaching data as the single body part image IMG_BDP and the plural body parts image IMG_PBDP or the single body part feature image FIMG_BDP and the plural body parts feature image FIMG_PBDP generated in Step S18_2 in FIG. 16, and correct values, correct values Z3_CV of joint coordinates in the single body part region Z2_CV and correct values Z3_CV of joint coordinates in the plural body parts region Z2*_CV determined in S11 and S12 in FIG. 11. The processor performs the learning by the above-mentioned stochastic gradient descent or minibatch. In this learning step, the processor optimizes a parameter (such as a weighted value) W3 of DNN_3.

[Learning of DNN_4]

Next, the processor inputs input images IMG_IN or feature images FIMG of a fourth set of teaching data to DNN_1 in a connection network of DNN_1, DNN_2, and DNN_3 for which the optimized parameters W1, W2, and W3 have been set, and executes arithmetic operation of DNN_1, DNN_2, and DNN_3 to estimate a set of candidates Z3=C_JT_CRD of joint coordinates in a single body part region and a plural body parts region (S20). The set of candidates Z3=C_JT_CRD of the joint coordinates are used as input values of teaching data for the learning of DNN_4.

Instead of Step S20, correct values Z3_CV of candidates of joint coordinates in a single body part region and a plural body parts region in a fourth set of teaching data, which are determined in Steps S11 and S12 in FIG. 11, may be used.

Figure 18:
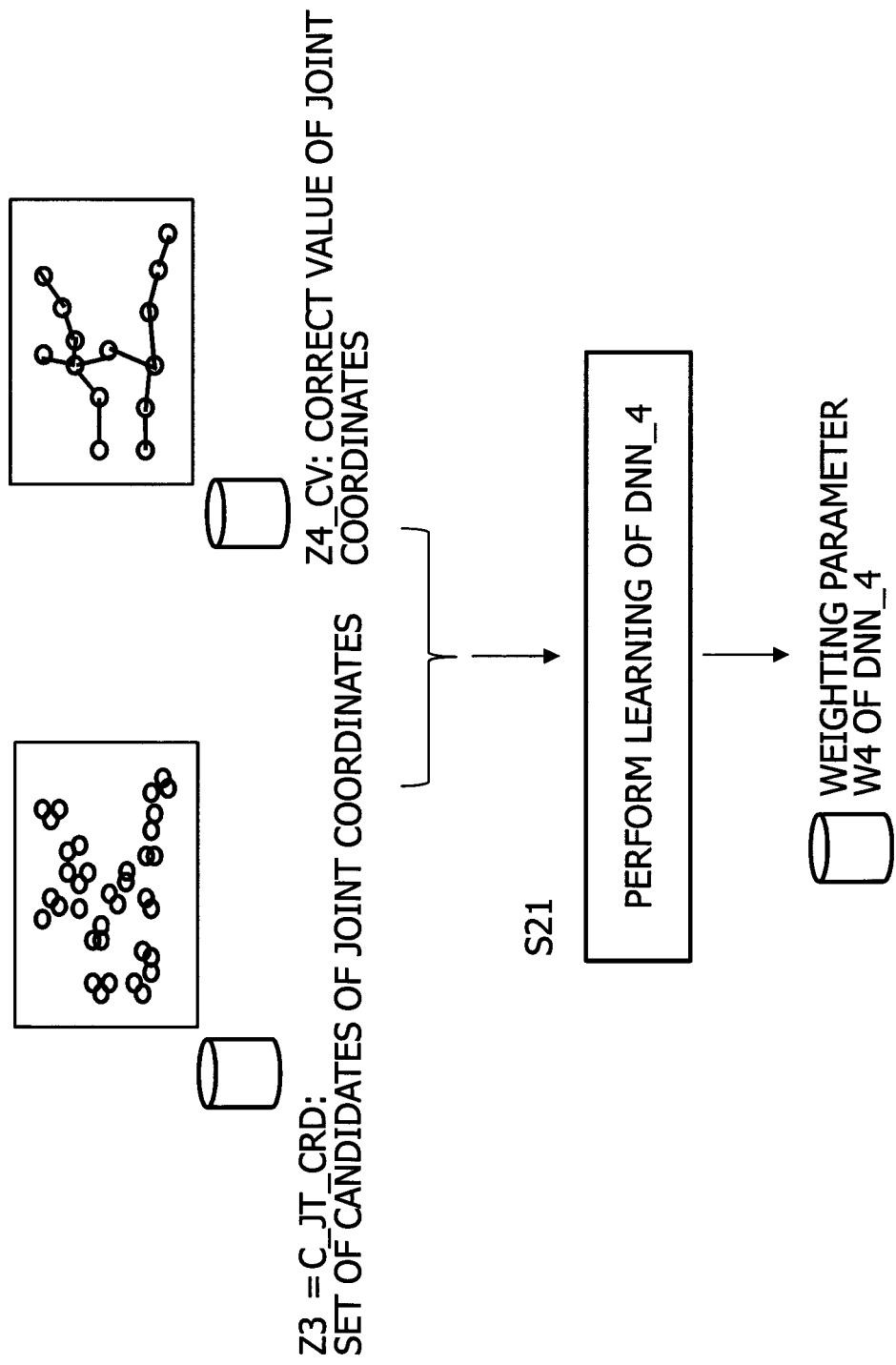
FIG. 18 is a diagram for describing the learning of DNN_4.

FIG. 18 is a diagram for describing the learning of DNN_4. The processor executes learning of DNN_4 (S21) by using inputs of teaching data as a set of candidates Z3=C_JT_CRD of joint coordinates determined in Step S20 in FIG. 17 and correct values as correct values Z4_CV of joint coordinates in FIG. 11. The learning is performed by the above-mentioned stochastic gradient descent or minibatch. In this learning step, the processor optimizes a parameter (such as a weighted value) W4 for DNN_4.

[Learning of Entire DNN in Step S34]

The processing until Step S33 in FIG. 10 is finished. Next, the processor executes the learning of the entire DNN obtained by connecting DNN_1, DNN_2, DNN_3-1 to DNN_3-N, DNN_4, which are all DNN_n (S34). For example, it is preferred that the learning of the entire DNN be multitask learning.

FIG. 19 is a diagram for describing learning of the entire DNN in Step S34. The processor sets the weighting parameters W1, W2, W3, and W4 optimized in Steps S14, S17, S19, and S20 to the initial values of the respective DNN_n, and executes arithmetic operation of DNN_1, DNN_2, DNN_3-1 to DNN_3-N, and DNN_4, the masking layers MSK_L1 and L2, and the scaling layers SC_L1 and L2 by using inputs of teaching data as input images X=IMG_IN of a fifth set of teaching data. As a result, the processor calculates or estimates coordinates Z1=HB_R of a region where a human body is present from the arithmetic operation of DNN_1, coordinates Z2=BDP_R of a single body part region and coordinates Z2*=PBDP_R of a plural body parts region from the arithmetic operation of DNN_2, a set of coordinates Z3=C_JT_CRD of joint candidates from the arithmetic operation of DNN_3, and a set of coordinates Z4=JT_CRD of joints from the arithmetic operation of DNN_4.

Next, the weighting parameters W1, W2, W3, and W4 for DNN_n are updated by the gradient method. In multitask learning, a new weighting parameter $W_{new}$ is determined by the following arithmetic operation.

$$W_{new}=W_{old}-d*\Sigma_{i=1}^{10}*\partial/\partial W\{|Z1\text{-}Z1\_CV|^2+|Z2\text{-}Z2\_CV|^2+|Z4\text{-}Z4\_CV|^2\}$$

where d is the learning rate, i is the number of teaching data. $\partial/\partial W\{|Z1\text{-}Z1\_CV|^2+|Z2\text{-}Z2\_CV|^2+|Z4\text{-}Z4\_CV|^2\}$ is the gradient. $\Sigma_{i=1}^{10}$ is outside the brackets of the partial differential $\partial/\partial W$, but is equivalent to the one in the brackets.

In the above-mentioned multitask learning, the square sums of DNN_1, DNN_2, and DNN_4 are accumulated to calculate the gradient $\partial/\partial W$, and hence the number of steps until the optimization of parameters of DNN_n can be reduced. As the parameter for DNN_3, the parameter optimized by the learning of DNN_3 is used as it is.

In common learning, a new weighting parameter $W_{new}$ is determined by the following arithmetic operation.

$$W_{new}=W_{old}-d*\Sigma_{i=1}^{10}*\partial/\partial W|Z4\text{-}Z4\_CV|^2$$

In this method, the weighting parameter is optimized such that an output Z4 of the DNN obtained by connecting DNN_1, DNN_2, DNN_3, and DNN_4 approaches a correct value Z4_CV, and hence the accuracy of optimization is not improved so much or a large amount of teaching data and the arithmetic operation of the entire DNN are required for the optimization.

As described above, according to this embodiment, a DNN for detecting the position of a joint of an animal from an image in which the animal appears can be efficiently learned to generate a highly accurate DNN. The learned DNN can calculate or estimate the positions of joints of an animal from an image in which the animal appears with high accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A joint position estimation device, comprising:
   a memory; and
   a processor connected to the memory,
   wherein the processor executes a process including:
   executing learning of a first deep neural network (DNN), by using as inputs of first teaching data input images and as correct data of the first teaching data a body part region of an animal in the input image;
   executing learning of a second DNN by using as inputs of second teaching data an image of a body part region in the input image of the second teaching data and an image of a plural body parts region in which a plurality of the body part regions are connected, and as correct data of the second teaching data joint positions in the body part region and the plural body parts region;
   estimating, by the first DNN for which a first parameter determined by learning of the first DNN has been set, the body part region of the animal with respect to input image to be processed; and
   estimating, by the second DNN for which a second parameter determined by learning of the second DNN has been set, a first joint position and a second joint position in each of the body part region estimated by the first DNN and a plural body parts region in which a plurality of the body part regions are connected.

2. The joint position estimation device according to claim 1, wherein the process further including:
   estimating the body part region of the animal with respect to an input image of the second teaching data by the first DNN for which the first parameter has been set.

3. The joint position estimation device according to claim 1, wherein the process further including:
   generating images of the body part region and the plural body parts region, which are inputs of the second teaching data, by cropping the body part region and the plural body parts region in the input image of the second teaching data from the input image of the second teaching data.

4. The joint position estimation device according to claim 1, wherein
   the first DNN includes a third DNN and a fourth DNN, and
   the executing the learning of the first DNN includes:
   executing learning of the third DNN by using as inputs of third teaching data input images of the first teaching data, and as correct data of the third teaching data animal regions where an animal is present in the input images; and
   executing learning of the fourth DNN by using as inputs of fourth teaching data images of the animal regions where the animal is present in an input images of the fourth teaching data, and as correct data of the fourth teaching data body part regions of the animal, and
   the estimating a body part region of the animal with respect to the input image to be processed by the first DNN includes:
   estimating, by the third DNN for which a third parameter determined by the learning of the third DNN has been set, the animal region with respect to the input image to be processed; and
   estimating, by the fourth DNN for which a fourth parameter determined by the learning of the fourth DNN has been set, the body part region of the animal with respect to an image of an animal region obtained by cropping the estimated animal region from the input image to be processed.

5. The joint position estimation device according to claim 4, wherein an image of an animal region in an input image of the fourth teaching data, which is an input of the fourth teaching data, is generated by cropping the animal region estimated by the third DNN for which the third parameter has been set from the input image.

6. The joint position estimation device according to claim 1, wherein the process further including:
   executing learning of a fifth DNN by using as inputs of fifth teaching data the first joint position and the second joint position, and as correct data of the fifth teaching data a third joint position including the first joint position and the second joint position; and
   estimating, by the fifth DNN for which a fifth parameter determined by the learning of the fifth DNN has been set, the third joint position with respect to the first joint position and the second joint position estimated by the second DNN.

7. The joint position estimation device according to claim 1, wherein the executing the learning includes repeating calculation of a total of square sums of differences between output estimated by the DNN with respect to inputs of a predetermined number of teaching data and the correct data and updating the parameter based on a gradient of the total until the total becomes less than a reference value.

8. The joint position estimation device according to claim 1, wherein the process further including:
   estimating, by the first DNN for which the first parameter has been set, the body part region with respect to input images as inputs of sixth teaching data, and estimating, by the second DNN for which the second parameter has been set, the first joint position and the second joint position with respect to the estimated body part region and the plural body parts region;
   repeating
   calculation of a total of first square sums of differences between the body part region estimated by the first DNN and correct data of the first DNN and second square sums of differences between the first joint position and the second joint position estimated by the second DNN and correct data of the second DNN and
   update of the first parameter and the second parameter on the basis of a gradient of the total
   until the total becomes less than a reference value.

9. A joint position estimation method, comprising:
   executing learning of a first deep neural network (DNN), by using as inputs of first teaching data input images and as correct data of the first teaching data a body part region of an animal in the input image;

executing learning of a second DNN by using as inputs of second teaching data an image of a body part region in the input image of the second teaching data and an image of a plural body parts region in which a plurality of the body part regions are connected, and as correct data of the second teaching data joint positions in the body part region and the plural body parts region;

estimating, by the first DNN for which a first parameter determined by learning of the first DNN has been set, the body part region of the animal with respect to input image to be processed; and estimating, by the second DNN for which a second parameter determined by learning of the second DNN has been set, a first joint position and a second joint position in each of the body part region estimated by the first DNN and a plural body parts region in which a plurality of the body part regions are connected.

10. A non-transitory computer-readable storage medium storing therein a joint position estimation program for causing a computer to execute a process comprising:

executing learning of a first deep neural network (DNN), by using as inputs of first teaching data input images and as correct data of the first teaching data a body part region of an animal in the input image;

executing learning of a second DNN by using as inputs of second teaching data an image of a body part region in the input image of the second teaching data and an image of a plural body parts region in which a plurality of the body part regions are connected, and as correct data of the second teaching data joint positions in the body part region and the plural body parts region;

estimating, by the first DNN for which a first parameter determined by learning of the first DNN has been set, the body part region of the animal with respect to input image to be processed; and estimating, by the second DNN for which a second parameter determined by learning of the second DNN has been set, a first joint position and a second joint position in each of the body part region estimated by the first DNN and a plural body parts region in which a plurality of the body part regions are connected.

* * * * *